US011746006B2

(12) United States Patent
Milstein et al.

(10) Patent No.: US 11,746,006 B2
(45) Date of Patent: Sep. 5, 2023

(54) REVERSIBLE LIQUID ORGANIC SYSTEM FOR LOADING AND DISCHARGING HYDROGEN BASED ON ETHYLENE GLYCOL

(71) Applicant: YEDA RESEARCH AND DEVELOPMENT CO. LTD., Rehovot (IL)

(72) Inventors: David Milstein, Rehovot (IL); You-Quan Zou, Rehovot (IL); Aviel Anaby, Rehovot (IL)

(73) Assignee: YEDA RESEARCH AND DEVELOPMENT CO. LTD., Rehovot (IL)

( * ) Notice: Subject to any disclaimer, the term of this patent is extended or adjusted under 35 U.S.C. 154(b) by 0 days.

(21) Appl. No.: 17/416,772

(22) PCT Filed: Dec. 30, 2019

(86) PCT No.: PCT/IL2019/051440
§ 371 (c)(1),
(2) Date: Jun. 21, 2021

(87) PCT Pub. No.: WO2020/141520
PCT Pub. Date: Jul. 9, 2020

(65) Prior Publication Data
US 2022/0073344 A1    Mar. 10, 2022

(30) Foreign Application Priority Data
Dec. 31, 2018 (IL) .......................................... 264043

(51) Int. Cl.
| C01B 3/00 | (2006.01) |
| B01J 31/18 | (2006.01) |
| B01J 31/20 | (2006.01) |
| B01J 31/24 | (2006.01) |

(52) U.S. Cl.
CPC ........... C01B 3/0015 (2013.01); B01J 31/189 (2013.01); B01J 31/20 (2013.01); B01J 31/2404 (2013.01); B01J 2231/763 (2013.01); B01J 2531/821 (2013.01)

(58) Field of Classification Search
CPC ...... B01J 31/189; B01J 31/20; B01J 31/2404; B01J 2231/763; B01J 2531/821
See application file for complete search history.

(56) References Cited

U.S. PATENT DOCUMENTS

| 2,765,311 | A | 10/1956 | Horrobin et al. |
| 4,317,946 | A | 3/1982 | Costa |
| 4,401,819 | A | 8/1983 | Cordier et al. |
| 7,101,530 | B2 | 9/2006 | Pez et al. |
| 7,351,395 | B1 | 4/2008 | Pez et al. |
| 10,533,028 | B2* | 1/2020 | Milstein ............... B01J 31/2404 |
| 2005/0002857 | A1 | 1/2005 | Pez et al. |
| 2010/0022791 | A1 | 1/2010 | Ihm et al. |
| 2011/0092711 | A1 | 4/2011 | Pianzola et al. |
| 2013/0253230 | A1 | 9/2013 | Norman et al. |
| 2013/0281664 | A1 | 10/2013 | Milstein et al. |
| 2014/0328748 | A1 | 11/2014 | Goussev et al. |
| 2017/0107251 | A1* | 4/2017 | Milstein ............. C07D 295/023 |
| 2017/0283257 | A1 | 10/2017 | Milstein et al. |
| 2017/0283447 | A1 | 10/2017 | Milstein et al. |
| 2022/0024758 | A1* | 1/2022 | Milstein ................... C01B 3/22 |

FOREIGN PATENT DOCUMENTS

| EP | 3511294 A1 | 7/2019 |
| JP | 2004-203679 A | 7/2004 |
| JP | 2015-143161 | 8/2015 |
| WO | WO 2005/000457 A2 | 1/2005 |
| WO | WO 2016/035081 | 3/2016 |
| WO | WO 2018/048058 | 3/2018 |

OTHER PUBLICATIONS

A. Kumar et al., 140 Journal of the American Chemical Society, 7453-7457 (2018) (Year: 2018).*
P. Bonitatibus et al., 112 PNAS, 1687-1692 (2015) (Year: 2015).*
Y. Zou et al., 27 Chemistry—A European Journal, 4715-4722 (2021) (Year: 2021).*
Y. Zou et al., 5 Nat Catal. (2019) (Year: 2019).*
M. Onoda et al., 44 International Journal of Hydrogen Energy, 28514-28520 (2019) (Year: 2019).*
Y. Zou et al., 11 Chemical Science, 7188-7193 (2020) (Year: 2020).*
J. Cho et al., 11 Catalysts, 1-29 (2021) (Year: 2021).*
Q. Zohu et al., 26 Chemistry—A European Journal, 15487-15490 (2020) (Year: 2020).*
Aakko-Saksa et al. (2018). Liquid organic hydrogen carriers for transportation and storing of renewable energy—Review and discussion. *Journal of Power Sources*, 396, 803-823.
Armarego et al. (2000). Purification of Laboratory Chemicals, 4th Edition; Butterworth-Heineman: Oxford.pp 223, 273,361 and 381.
Bellows et al. (2017). Anuncanny dehydrogenation mechanism: polar bond control over stepwise or concerted transition states. Inorganic chemistry, 56(10), 5519-5524.
Bockris. (2013). The hydrogen economy: Its history. International Journal of Hydrogen Energy, 38(6), 2579-2588.
Bockris JM. "A Hydrogen Economy" Science. Jun. 23, 1972;176 (4041):1323.

(Continued)

*Primary Examiner* — Alexander R Pagano
(74) *Attorney, Agent, or Firm* — Mark S. Cohen; PEARL COHEN ZEDEK LATZER BARATZ LLP

(57) ABSTRACT

This invention provides a reversible hydrogen loading and discharging system and a reversible method for loading and discharging hydrogen. The system and the methods of this invention comprise ethylene glycol as a liquid organic hydrogen carrier and at least one transition metal. By reacting ethylene glycol with at least one transition metal; at least one hydrogen molecule and at least one oligoester of ethylene glycol are formed (hydrogen releasing)•, and by reacting at least one oligoester of ethylene glycol with at least one transition metal and at least one hydrogen molecule, at least one ethylene glycol is formed (hydrogen loading).

14 Claims, 8 Drawing Sheets

(56) References Cited

OTHER PUBLICATIONS

Boddien et al. (2011). Efficient dehydrogenation of formic acid using an iron catalyst. *Science*, 333(6050), 1733-1736.
BP Energy Outlook. 2018, pp. 1-125.
Calbo et al. (2015). The Nonlocal Correlation Density Functional VV10: A Successful Attempt to Accurately Capture Noncovalent Interactions. In *Annual Reports in Computational Chemistry* (vol. 11, pp. 37-102). Elsevier.
Chiron et al. (2003). Reactivity of the acridine ring: One-pot regioselective single and double bromomethylation of acridine and some derivatives. *Synlett*, 2003(15), 2349-2350.
Cui et al., (2008). The effect of substitution on the utility of piperidines and octahydroindoles for reversible hydrogen storage. New Journal of Chemistry, 32(6), 1027-103.
Chu et al.(2012). Opportunities and challenges for a sustainable energy future. nature, 488(7411), 294-303.
Chakraborty et al. (2014). A molecular iron catalyst for the acceptorless dehydrogenation and hydrogenation of N-heterocycles. Journal of the American Chemical Society, 136(24), 8564-8567.
Cortright et al. (2002). Hydrogen from catalytic reforming of biomass-derived hydrocarbons in liquid water. Nature, 418(6901), 964-968.
Crabtree. (2017). Nitrogen-containing liquid organic hydrogen carriers: progress and prospects.4491-4498.
Crabtree. (2017). Homogeneous transition metal catalysis of acceptorless dehydrogenative alcohol oxidation: applications in hydrogen storage and to heterocycle synthesis. *Chemical reviews*, 117(13), 9228-9246.
Dalebrook et al. (2013). Hydrogen storage: beyond conventional methods. Chemical Communications, 49(78), 8735-8751.
Dean et al. (2011).The effect of temperature, catalyst and sterics on the rate of N-heterocycle dehydrogenation for hydrogen storage. New Journal of Chemistry, 35(2), 417-422.
Doe (2016). Technical Targets for Onboard Hydrogen Storage for Light-Duty Vehicles; U.S. Doe: Washington, D.C pp. 1-5.
Dohm et al. (2018). Comprehensive thermochemical benchmark set of realistic closed-shell metal organic reactions. *Journal of chemical theory and computation*, 14(5), 2596-2608.
Drive, U. S. (2015). Target explanation document: onboard hydrogen storage for light-duty fuel cell vehicles, pp. 1-22.
Eberle et al. (2012). Fuel cell electric vehicles and hydrogen infrastructure: status 2012. *Energy & Environmental Science*, 5(10), 8780-8798.
Eberle et al. (2009). Chemical and physical solutions for hydrogen storage. *Angewandte Chemie International Edition*, 48(36), 6608-6630.
Esteruelas et al. (2017). Osmium Hydride Acetylacetonate Complexes and Their Application in Acceptorless Dehydrogenative Coupling of Alcohols and Amines and for the Dehydrogenation of Cyclic Amines. Organometallics, 36(15), 2996-3004.
Fogler et al. (2014). System with Potential Dual Modes of Metal-Ligand Cooperation: Highly Catalytically Active Pyridine-Based PNNH-Ru Pincer Complexes. *Chemistry—A European Journal*, 20(48), 15727-15731.
Forberg et al. (2016). Single-catalyst high-weight% hydrogen storage in an N-heterocycle synthesized from lignin hydrogenolysis products and ammonia. Nature communications, 7, 13201, pp. 1-6.
FCH, J. (2014).Fuel Cells and Hydrogen Joint Undertaking (FCH2 JU) Governing Board. Multi-Annual Work Plan 2014-2020; FCH2 JU: Brussels, Belgium, pp. 1-79.
Fujita et al. (2014). Homogeneous perdehydrogenation and perhydrogenation of fused bicyclic N-heterocycles catalyzed by iridium complexes bearing a functional bipyridonate ligand. Journal of the American Chemical Society, 136(13), 4829-4832.
Fujita et al. (2017). Reversible Interconversion between 2, 5-Dimethylpyrazine and 2, 5-Dimethylpiperazine by Iridium-Catalyzed Hydrogenation/Dehydrogenation for Efficient Hydrogen Storage. *Angewandte Chemie International Edition*, 56(36), 10886-10889.
Gellrich et al. (2015). Mechanistic investigations of the catalytic formation of lactams from amines and water with liberation of H2. Journal of the American Chemical Society, 137(14), 4851-4859.
Gianotti et al. (2018). High-purity hydrogen generation via dehydrogenation of organic carriers: a review on the catalytic process. ACS Catalysis, 8(5), 4660-4680.
Gnanaprakasam et al. (2010). Direct synthesis of imines from alcohols and amines with liberation of H2. Angewandte Chemie International Edition, 49(8), 1468-1471.
Gottlieb et al. (1997). NMR chemical shifts of common laboratory solvents as trace impurities. Journal of Organic Chemistry, 62(21), 7512-7515.
Grimme et al. (2010). A consistent and accurate ab initio parametrization of density functional dispersion correction (DFT-D) for the 94 elements H—Pu. The Journal of chemical physics, 132(15), 154104.
Gunanathan et al. (2007). Direct synthesis of amides from alcohols and amines with liberation of H2. Science, 317(5839), 790-792.
Gunanathan et al. (2013). Applications of acceptorless dehydrogenation and related transformations in chemical synthesis. Science, 341(6143).
Gunanathan et al. (2008). Selective synthesis of primary amines directly from alcohols and ammonia. Angewandte Chemie (International ed. in English), 47(45), 8661-8664.
Gunanathan et al. (2010). "Long-Range" Metal-Ligand Cooperation in H2 Activation and Ammonia-Promoted Hydride Transfer with a Ruthenium-Acridine Pincer Complex. Journal of the American Chemical Society, 132(42), 14763-14765.
He et al. (2015). Liquid organic hydrogen carriers. Journal of energy chemistry, 24(5), 587-594.
He et al. (2016). Hydrogen carriers. Nature Reviews Materials, 1(12), 16059, pp. 1-17.
Heim et al. (2014). Selective and mild hydrogen production using water and formaldehyde. Nature communications, 5(1), 1-8.
Höök et al. (2013). Depletion of fossil fuels and anthropogenic climate change—A review. Energy policy, 52, 797-809.
Hu et al. (2015). A novel liquid organic hydrogen carrier system based on catalytic peptide formation and hydrogenation. Nature communications, 6(1), 1-7.
Hu et al. (2016). Rechargeable Hydrogen Storage System Based on the Dehydrogenative Coupling of Ethylenediamine With Ethanol. Angewandte Chemie (International ed. in English), 55(3), 1061-1064.
Huber et al. (2003). Raney Ni—Sn catalyst for H2 production from biomass-derived hydrocarbons. Science, 300(5628), 2075-2077.
Hull et al. (2012). Reversible hydrogen storage using CO 2 and a proton-switchable iridium catalyst in aqueous media under mild temperatures and pressures. Nature chemistry, 4(5), 383.
International Search Report for PCT Application No. PCT/IL2020/050153 dated May 19, 2020.
International Search Report for PCT Application No. PCT/IL2019/051440 dated Mar. 10, 2020.
Johnson et al. (2010). Hydrogen generation from formic acid and alcohols using homogeneous catalysts. Chemical Society Reviews, 39(1), 81-88.
Jones LW. (1971). Liquid hydrogen as a fuel for the future. Science, 174(4007), 367-370.
Kothandaraman et al.. (2017). Efficient reversible hydrogen carrier system based on amine reforming of methanol. Journal of the American Chemical Society, 139(7), 2549-2552.
Kumar et al. (2018). Selective hydrogenation of cyclic imides to diols and amines and its application in the development of a liquid organic hydrogen carrier. Journal of the American Chemical Society, 140(24), 7453-7457.
Li et al. Y. (2015). Ruthenium-catalyzed hydrogen generation from glycerol and selective synthesis of lactic acid. Green Chemistry, 17(1), 193-198.
Lin et al. (2017). Low-temperature hydrogen production from water and methanol using Pt/α-MoC catalysts. Nature, 544(7648), 80-83.
Mardirossian et al. (2014). ωB97X-V: A 10-parameter, range-separated hybrid, generalized gradient approximation density functional with nonlocal correlation, designed by a survival-of-the-fittest strategy. *Physical Chemistry Chemical Physics*, 16(21), 9904-9924.

(56) References Cited

OTHER PUBLICATIONS

Mellmann et al. (2016). Formic acid as a hydrogen storage material—development of homogeneous catalysts for selective hydrogen release. Chemical Society Reviews, 45(14), 3954-3988.
Mondal et al. (2015). Control in the rate-determining step provides a promising strategy to develop new catalysts for CO2 Hydrogenation: a local pair natural orbital coupled cluster theory study. Inorganic chemistry, 54(15), 7192-7198.
Morton et al. (1988). Molecular hydrogen complexes in catalysis: highly efficient hydrogen production from alcoholic substrates catalysed by ruthenium complexes. Journal of the Chemical Society, Chemical Communications, (17), 1154-1156.
Nielsen et al. (2013). Low-temperature aqueous-phase methanol dehydrogenation to hydrogen and carbon dioxide. Nature, 495(7439), 85-89.
Oh et al. (2018). 2-(N-Methylbenzyl) pyridine: A Potential Liquid Organic Hydrogen Carrier with Fast H2 Release and Stable Activity in Consecutive Cycles. ChemSusChem, 11(4), 661-665.
Palo et al. (2007). Methanol steam reforming for hydrogen production. Chemical reviews, 107(10), 3992-4021.
Parrish et al. (2017). Psi4 1.1: An open-source electronic structure program emphasizing automation, advanced libraries, and interoperability. Journal of chemical theory and computation, 13(7), 3185-3197.
Patil et al. (2017). On H2 supply through liquid organic hydrides—Effect of functional groups. International Journal of Hydrogen Energy, 42(25), 16214-16224.
Preuster et al. (2017). Liquid organic hydrogen carriers (LOHCs): toward a hydrogen-free hydrogen economy. Accounts of chemical research, 50(1), 74-85.
Qian et al. (2010). Palladium-catalyzed benzylic addition of 2-methyl azaarenes to N-sulfonyl aldimines via C—H bond activation. Journal of the American Chemical Society, 132(11), 3650-3651.
Rodríguez-Lugo et al. (2013). A homogeneous transition metal complex for clean hydrogen production from methanol-water mixtures. Nature chemistry, 5(4), 342-347.
Sadaghiani et al. (2017). Introducing and energy analysis of a novel cryogenic hydrogen liquefaction process configuration. International journal of hydrogen energy, 42(9), 6033-6050.
Schildhauer et al. (2001). The equilibrium constant for the methylcyclohexane-toluene system. Journal of Catalysis, 198(2), 355-358.
Schlapbach et al. (2001). Hydrogen-storage materials for mobile applications: Materials for clean energy. Nature (London), 414(6861), 353-358.
Serp et al. (2009). Carbon materials for catalysis. Hoboken, NJ: John Wiley & Sons, pp. 5-23.
Singh et al. (2015). Hydrogen: A sustainable fuel for future of the transport sector. Renewable and Sustainable Energy Reviews, 51, 623-633.
Steele et al.(2001). "Materials for fuel-cell technologies: Materials for clean energy" Nature. 414(6861):345-52.
Taube et al. (1983). A system of hydrogen-powered vehicles with liquid organic hydrides. International Journal of Hydrogen Energy, 8(3), 213-225.
Trincado et al. (2017). Homogeneously catalysed conversion of aqueous formaldehyde to H 2 and carbonate. Nature communications, 8(1), 1-11.
Trincado et al. (2014). Molecular catalysts for hydrogen production from alcohols. Energy & Environmental Science, 7(8), 2464-2503.
Wang et al. (2014). The intensification technologies to water electrolysis for hydrogen production—a review. Renewable and Sustainable Energy Reviews, 29, 573-588.
Wang et al. (2013). One-pot conversion of cellulose to ethylene glycol with multifunctional tungsten-based catalysts. Accounts of chemical research, 46(7), 1377-1386.
Weigend et al. (2005). Balanced basis sets of split valence, triple zeta valence and quadruple zeta valence quality for H to Rn: Design and assessment of accuracy. Physical Chemistry Chemical Physics, 7(18), 3297-3305.
Weigend et al. (2006). Accurate Coulomb-fitting basis sets for H to Rn. *Physical chemistry chemical physics*, 8(9), 1057-1065.
Winsche et al. (1973). Hydrogen: its future role in the nation's energy economy. Science, 180(4093), 1325-1332.
Yadav et al. (2012). Liquid-phase chemical hydrogen storage materials. Energy & Environmental Science, 5(12), 9698-9725.
Yamaguchi et al. (2009). Homogeneous catalytic system for reversible dehydrogenation-hydrogenation reactions of nitrogen heterocycles with reversible interconversion of catalytic species. *Journal of the American Chemical Society*, 131(24), 8410-8412.
Yang et al. (2018). Study of hydrogenation and dehydrogenation of 1-methylindole for reversible onboard hydrogen storage application. International Journal of Hydrogen Energy, 43(18), 8868-8876.
Ye et al. (2012). Electronic Structure Analysis of the Oxygen-Activation Mechanism by FeII-and α-Ketoglutarate (αKG)-Dependent Dioxygenases. Chemistry—A European Journal, 18(21), 6555-6567.
Yue et al. (2012). Ethylene glycol: properties, synthesis, and applications. Chemical Society Reviews, 41(11), 4218-4244.
Zhang et al. (2005). Facile conversion of alcohols into esters and dihydrogen catalyzed by new ruthenium complexes. Journal of the American Chemical Society, 127(31), 10840-10841.
Zhang et al. (2006). Efficient homogeneous catalytic hydrogenation of esters to alcohols. *Angewandte Chemie*, 118(7), 1131-1133.
Zhao et al. (2006). A new local density functional for main-group thermochemistry, transition metal bonding, thermochemical kinetics, and noncovalent interactions. *The Journal of chemical physics*, 125(19), 194101.

\* cited by examiner

H12-NEC      HSC: 5.8 wt%      NEC

■ Widely accesible    ■ Used globally    ■ Renewable

Liquid      Liquid      $x+y = n$

■ HSC: 6.5 wt% (maxmium)

■ Inexpensive    ■ Reversible    ■ Convenient

FIGURE 2

REVERSIBLE LIQUID ORGANIC SYSTEM FOR LOADING AND DISCHARGING HYDROGEN BASED ON ETHYLENE GLYCOL

CROSS-REFERENCE TO RELATED APPLICATIONS

This application is a National Phase Application of PCT International Application No. PCT/IL2019/051440, International Filing Date Dec. 30, 2019, claiming priority from Israel Patent Application No. 264043, filed on Dec. 31, 2018, which is hereby incorporated by reference.

BACKGROUND OF THE INVENTION

The process of industrialization has brought prosperity and wealth to large parts of humanity during the last centuries. However, one fundamental obstacle associated with these processes is the ever-increasing exhaustion of fossil resources, along with the generation of waste and emissions. This directly has an adverse environmental impact that might drastically threaten global living conditions in the future. The search for alternative and sustainable energy systems to replace the current fossil fuel-based technologies has thus become one of the central scientific challenges of our society. In this context, hydrogen has long been regarded as an ideal alternative clean energy vector, which possesses an extremely high gravimetric energy density (lower heating value: 33.3 kWh/kg) and produces water as the sole byproduct upon combustion. These intrinsic properties of hydrogen make it a particularly attractive candidate for both stationary and mobile applications.

Recently, significant advances have been made in hydrogen-powered fuel cells. Nonetheless, hydrogen as energy vector has not yet been universally applied, which might be due to problems related to its storage and transport. Efficient storage of hydrogen is both crucial and challenging, due to its low volumetric energy density. Traditionally, hydrogen is stored physically in gas tanks under high pressure or as a liquid at cryogenic temperatures. However, the high energy input needed for storage, the low volumetric energy density, and potential safety issues largely limit applications using molecular hydrogen. Although extensive efforts have been made to store hydrogen in nanostructured materials, metal organic frameworks and metal hydrides, these systems suffer from low hydrogen storage capacities (HSCs), harsh conditions, low energy efficiency, and high cost.

In contrast, storing hydrogen in chemical bonds of small organic molecules, especially organic liquids, has received considerable research interests during the last few years. The usage of a proper catalytic system would allow for the efficient release of hydrogen by promoting the dehydrogenation reaction, and recovery of the hydrogen depleted substance by hydrogenation. In this scenario, methanol, formaldehyde, or formic acid are frequently introduced as hydrogen carries. Nevertheless, factors such as $CO_2$ release, (e.g., methanol and formaldehyde), toxicity, and low hydrogen storage capacity of formic acid (4.4 wt %) limit these approaches. Therefore, the development of novel and reversible hydrogen storage systems with satisfying economic and ecological benefits is highly desirable. In this regard, liquid organic hydrogen carriers (LOHCs) have emerged as a unique and powerful tool to advance this goal, wherein a pair of hydrogen-rich and hydrogen-deficient organic liquids can repeatedly discharge and load hydrogen via reversible and catalytic dehydrogenation and hydrogenation cycles (FIG. 1A). Ideally, LOHC would feature high safety and purity, low cost, easy transport, and reversibility, and would be compatible with the existing infrastructure for fossil fuels as liquid energy vectors. Importantly, in order for LOHC systems to become economically viable, the European Union and the US government set hydrogen storage capacity (HSC) goals of 5.0 wt % and 5.5 wt %, respectively. This paradigm was exemplified in a hydrogen storage system based on dodecahydro-N-ethylcarbazole (H12-NEC) and N-ethylcarbazole (NEC) with a HSC as high as 5.8 wt %, (FIG. 1B). Due to the favorable dehydrogenation thermodynamics (e.g., compared to cycloalkanes), liquid organic hydrogen carriers are continuously dominated by N-containing heterocycles, which nevertheless require high temperatures (which often result in decomposition products) and pressures for the catalytic process to be efficient. Several LOHC systems through dehydrogenative formation of amides and their hydrogenation, starting from ethanolamine, ethanol-ethylenediamine, 1,4-butanediol-ethylenediamine or methanol-ethylenediamine have been developed. In most cases, the amides (hydrogen-deficient compounds) are formed as solids from the dehydrogenative coupling of amines and alcohols. An ideal LOHC system would feature both the hydrogen-rich and hydrogen-deficient organic compounds as liquids. Therefore, there is still a need for a reversible liquid to liquid hydrogen storage systems based on cheap, green, renewable and abundant organic liquids with high hydrogen storage capacities.

Ethylene glycol (EG), a widely accessible odorless, colorless, viscous liquid, represents the simplest vicinal diol. EG is used globally, with more than 34 million tons global production capacity in 2016. For instance, it is a vital component in antifreeze and coolant systems in automobiles, and in deicing fluids for windshields and aircrafts. Moreover, it is extensively applied in the manufacturing of polyester fibers and resins, such as polyethylene terephthalate (PET). Importantly, ethylene glycol is not only derived from fossil resources, but also from biomass-derived hydrocarbons (FIG. 1C), highlighting its potential as a sustainable resource. Given that EG is a cheap, renewable, and already an industrially applied product, makes it a promising candidate for LOHC applications. Literature precedents show that EG is indeed suitable for liberating hydrogen in the presence of water under heterogeneous conditions. Nevertheless, the closing of the charge/discharge cycle by hydrogenation to reform EG has not been achieved, since competitive pathways are at play forming hydrogen, carbon dioxide and gaseous alkanes (C1-C2) as side-products. In 2005, it was disclosed that an efficient acceptorless dehydrogenative coupling of alcohols catalyzed by a ruthenium pincer complex via metal-ligand cooperation, enabling access to a wide range of esters with release of hydrogen under mild conditions. A year later the homogeneously catalyzed hydrogenation of esters under low pressure was reported. Since then, seminal works have been reported, highlighting the generalizability of these processes to different substrates.

SUMMARY OF THE INVENTION

Thus, in the first aspect of the present invention, this invention provides a reversible hydrogen loading and discharging system comprising: ethylene glycol; and at least one transition metal.

In one embodiment, this invention provides a reversible hydrogen loading and discharging system comprising: ethylene glycol as a liquid organic hydrogen carrier; and at least one transition metal.

In another aspect of the present invention, this invention provides a reversible hydrogen loading and discharging method comprising the steps of:
  a) hydrogen releasing process wherein ethylene glycol is reacted with at least one transition metal; thereby forming at least one hydrogen molecule and at least one oligoester of ethylene glycol;
  b) hydrogen loading process wherein said at least one oligoester of ethylene glycol is reacted with at least one transition metal and at least one hydrogen molecule; thereby forming at least one ethylene glycol.

The ethylene glycol (hydrogen-rich organic liquid) is capable of undergoing dehydrogenative esterification reactions to liquid oligoesters (hydrogen-deficient organic liquid), which may then be reversibly hydrogenated to ethylene glycol (FIG. 1D). The successful implementation of this cycle provides a novel LOHC system with a maximum theoretical HSC of 6.5 wt %, which is above the targets set for 2020 by the European Union (5.0 wt %) and the U.S. Department of Energy (5.5 wt %). Plotting the evolution of HSC with the degree of polymerization clearly shows that high HSC can be obtained already from pentamer (i.e. above 5.21 wt %, HSC=$(2n \times M_{H2})/[(n+1) \times M_{EG}]$, $M_{H2}$: molar mass of hydrogen (2.02 g/mol), $M_{EG}$: molar mass of ethylene glycol (62.07 g/mol)), and full conversion to high molecular weight polymers is not necessary to achieve the goals set for 2020 (FIG. 1E).

A reversible hydrogen loading and discharging/releasing system of this invention refers to any type of arrangement capable to holding the reactants of the reactions performed in said system, wherein the discharge and loading of hydrogen molecules is performed using ethylene glycol and at least one transition metal.

Upon reaction of ethylene glycol with said at least one transition metal, hydrogen molecules are released, to form the corresponding oligoester and the hydrogen molecule. The oligoester is capable of reacting again with another ethylene glycol molecule to form a further hydrogen molecule and a higher degree of oligoester.

Upon loading of hydrogen molecule, the oligoester is reacted with hydrogen molecules to form ethylene glycol.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

(FIG. 1A) General concept of liquid organic hydrogen carrier. OLS, organic liquids; Cat, catalyst. (FIG. 1B) Well-established liquid organic hydrogen carrier based on N-ethylcarbazole. NEC, N-ethylcarbazole. (FIG. 1C) Methods for producing ethylene glycol. (FIG. 1D) Concept and advantages using ethylene glycol as a liquid organic hydrogen carrier. HSC, hydrogen storage capacity. (FIG. 1E) Hydrogen storage capacity versus degree of polymerization based on ethylene glycol. (FIG. 1F) Possible reaction pathways for dehydrogenation and reverse hydrogenation using ethylene glycol and hypothesized challenges. EG, ethylene glycol; HEG, 2-hydroxyethyl glycolate.

Figure 2:
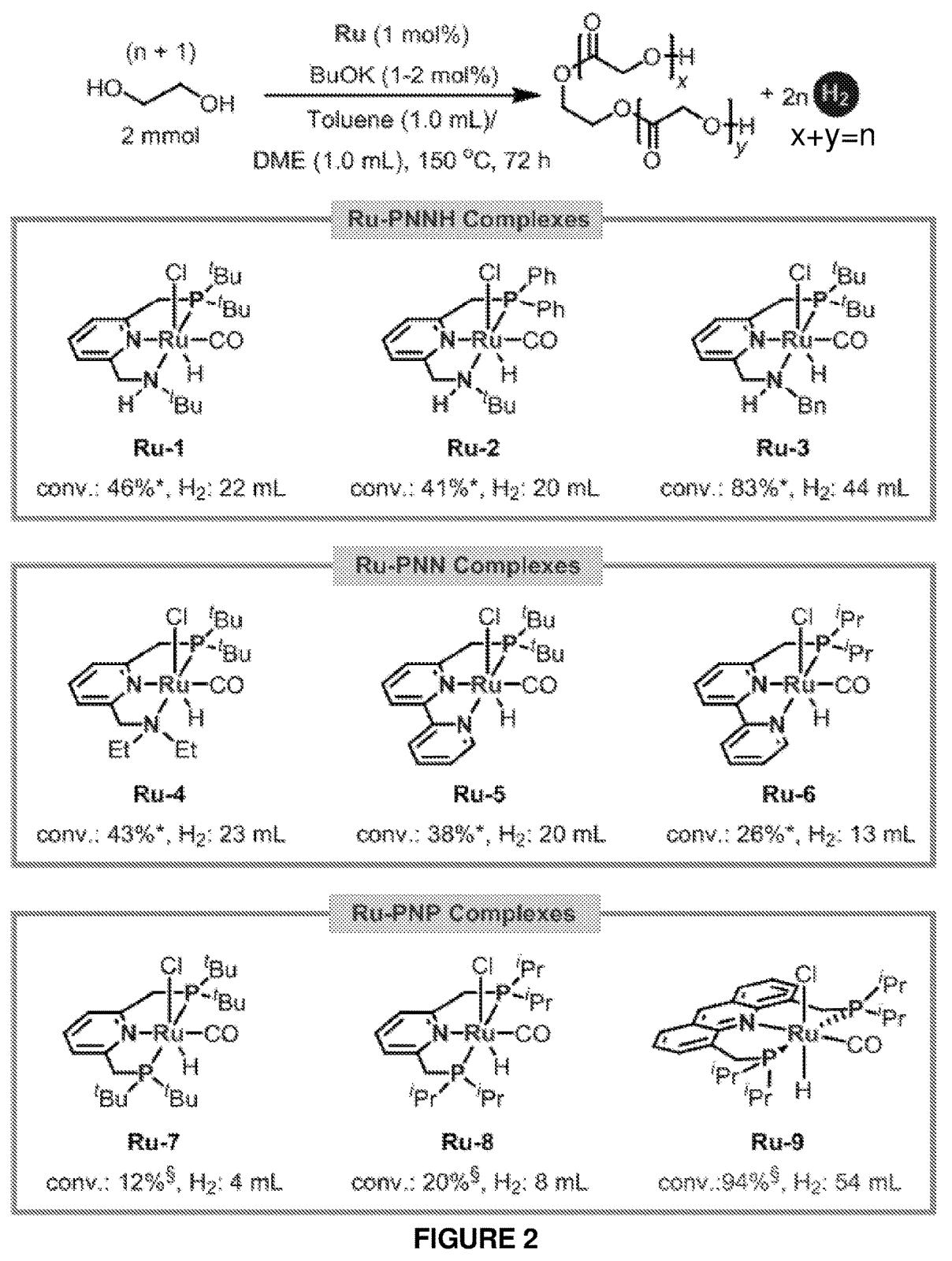

FIG. 2 shows the results of catalytic acceptorless dehydrogenative coupling of ethylene glycol. Reaction conditions: ethylene glycol (2.0 mmol), ruthenium pincer complex (1 mol %), $^t$BuOK (1-2 mol %), toluene/DME (1.0 mL/1.0 mL), 150° C., 72 hours. All conversions were determined by $^1$H NMR analysis of the reaction mixture using mesitylene as an internal standard. *2 mol % $^t$BuOK was used. § 1 mol % $^t$BuOK was used.

(FIG. 3A) Acceptorless dehydrogenative coupling of ethylene glycol catalyzed by the dearomatized complex Ru-10 without base. (FIG. 3B) Hydrogenation of the reaction mixture catalyzed by Ru-10. (FIG. 3C) Large scale reaction performed under partial vacuum without solvent.

Figure 1A:
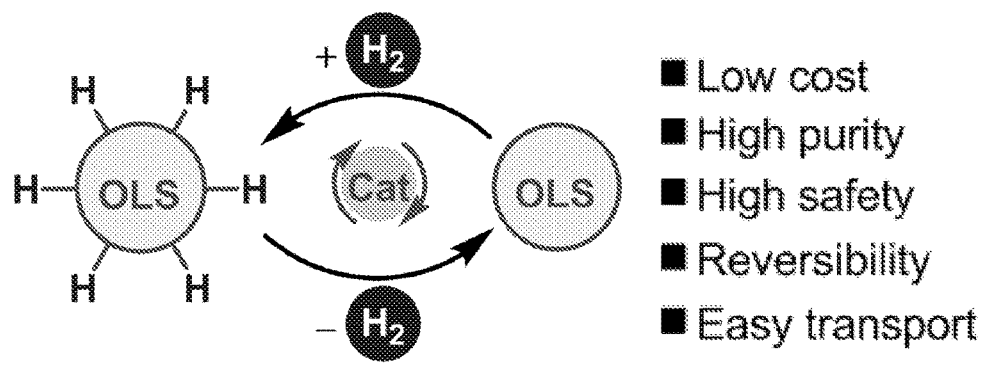
FIGS. 1A-1F show the development of a liquid organic hydrogen carrier system based on ethylene glycol.
Figure 1B:
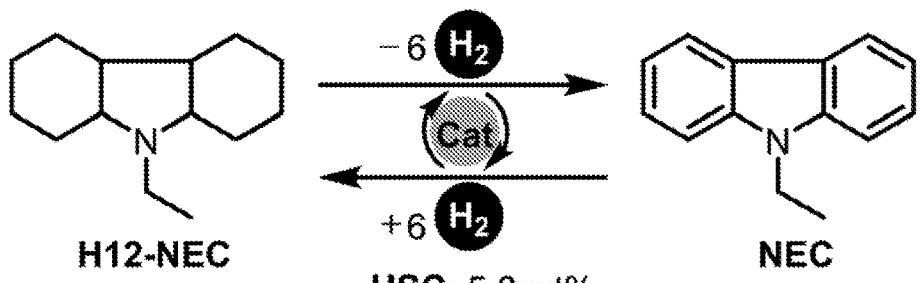
Figure 1C:
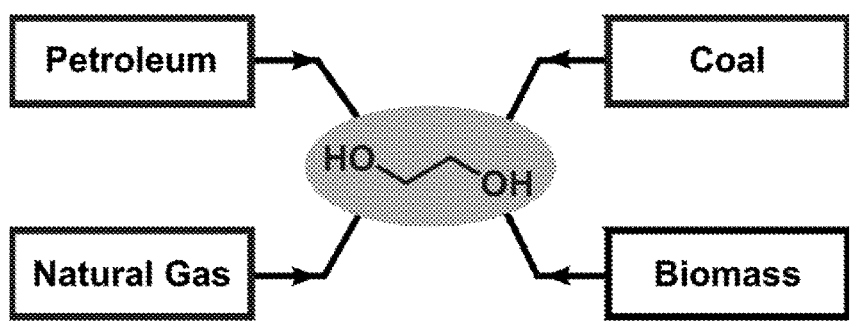
Figure 1D:
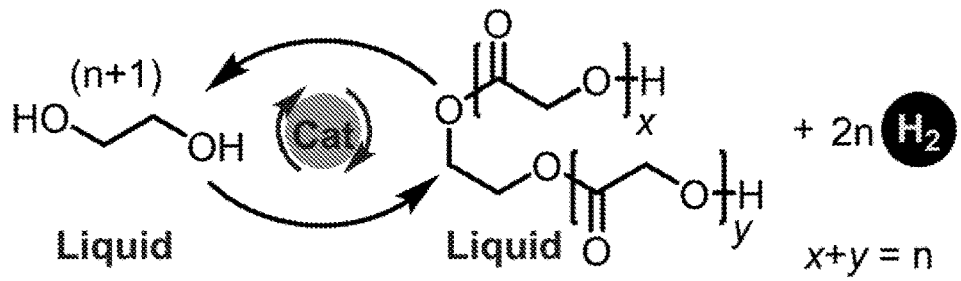
Figure 1E:
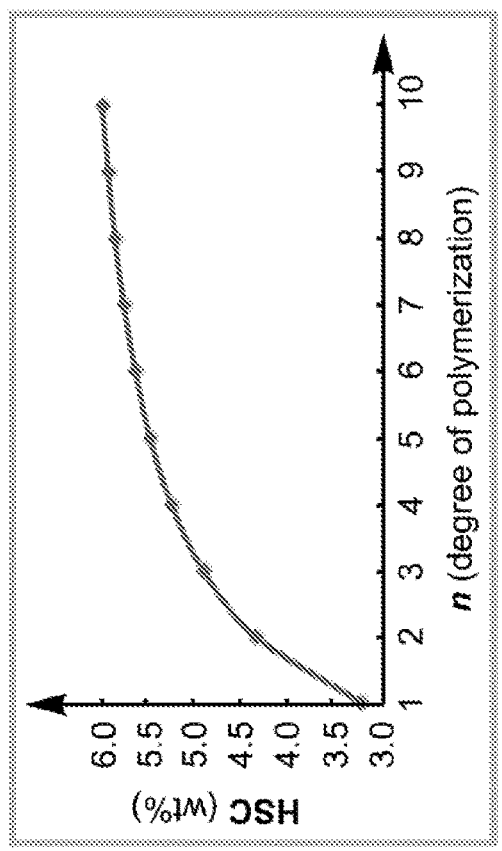

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The present invention provides a method and system for storing hydrogen (H$_2$) and releasing it on demand, based on the reaction of ethylene glycol with at least one transition metal to form the corresponding at least one oligoester and at least one hydrogen molecule. The oligoester is capable of reacting again with another ethylene glycol molecule to form a further at least one hydrogen molecule and a further at least one oligoester. In another embodiment, the transition metal is a catalyst.

Upon loading of hydrogen molecule, the at least one oligoester is reacted with at least one hydrogen molecule to form at least one ethylene glycol.

Scheme 1 presents the process and method of this invention for releasing and loading hydrogen molecule.

Scheme 1 presents the releasing and loading process of hydrogen.

Scheme 1

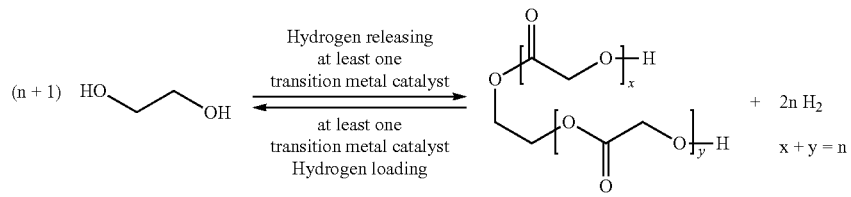

wherein x, y and n are each independently an integer.

In some embodiments at least one transition metal is the same in the hydrogen releasing and hydrogen loading reactions in a system of the invention.

In some embodiments releasing hydrogen and discharging hydrogen are used herein interchangeably; as well as releasing and discharging system are used herein interchangeably.

In some embodiments said at least one transition metal is selected from Mn, Fe, Co, Ni, Ru, Rh, Pd, Cu, Ag. In some embodiments said at least one transition metal is coordinated to at least one coordination complex. In some embodiments, said at least one transition metal is supported on insoluble matrices, such as inorganic oxides (for example alumina, silica, titania, zirconia, magnesia, zeolites, and combinations thereof, optionally attached via tether) or insoluble polymers (such as for example cross-linked polystyrene, attached via a tether).

In further embodiments, said at least one transition metal is at least one ruthenium pincer complex. In another embodiment, the transition metal used herein a transition metal catalyst.

Ruthenium Complexes

In some embodiments, said at least one ruthenium pincer complex used in the method and system of this invention is a complex of formula (I):

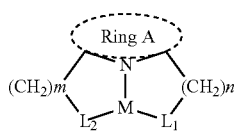

wherein:
  M is —Ru(CO)HX, —Ru(CO)H, —RuHX;
  X is a halogen (Cl, Br, I);
  m or n is 0, 1, 2;
  $L_1$ and $L_2$ is each independently selected P(alk$_1$)(alk$_2$), P(alk$_1$)(aryl), P(aryl)(aryl), N(alk$_1$)(alk$_2$), NH(alk$_1$), NH(aryl), NH(benzyl), N(alk$_1$)(aryl), N(aryl)(aryl), and heteroaryl; wherein alk$_1$, alk$_2$ are each independently straight or branched $C_1$-$C_{10}$ alkyl; heteroaryl is a nitrogen-aryl derivative selected from pyridine, pyrimidine, acridine, dihydroacridine, pyrrole, quinoline; wherein said nitrogen atom is coordinated with said M atom; and
  Ring A is selected from substituted or unsubstituted pyridine, pyrimidine, acridine, dihydroacridine, pyrrole, quinoline; wherein Ring A is substituted with one or more substituents, each independently selected from the group consisting of alkyl, cycloalkyl, aryl, heterocyclyl, heteroaryl, alkylcycloalkyl, alkylaryl, alkylheterocyclyl, alkylheteroaryl, halogen, nitro, amide, ester, cyano, alkoxy, alkylamino, arylamino, an inorganic support and a polymeric moiety.

In some embodiments, said at least one ruthenium pincer complex is selected from Ru—PNNH complex (wherein $L_1$ is P(alk$_1$)(alk$_2$), $L_2$ is NH(alk$_1$)), Ru—PNN complex (wherein $L_1$ is P(alk$_1$)(alk$_2$) or P(phenyl)(phenyl), $L_2$ is selected from N(alk$_1$)(alk$_2$) and heteroaryl), Ru—PNP complex (wherein $L_1$ and $L_2$ is independently P(alk$_1$)(alk$_2$) or P(phenyl)(phenyl)) and any combinations thereof.

In some embodiments Ring A is attached to an insoluble matrice, such as inorganic oxides (for example alumina or silica optionally attached via tether) or insoluble polymers (such as for example cross-linked polystyrene).

In some embodiments, said at least one ruthenium pincer complex is a Ru-pyridyl based complex of formula A1:

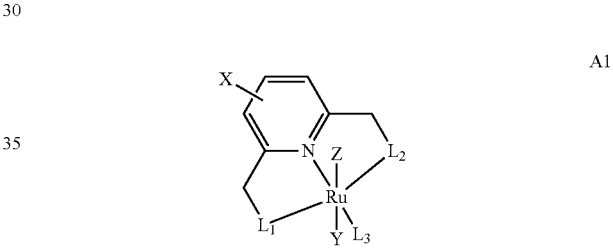

wherein
  $L_1$ and $L_2$ is each independently selected P(alk$_1$)(alk$_2$), P(alk$_1$)(aryl), P(aryl)(aryl), N(alk$_1$)(alk$_2$), NH(alk$_1$), NH(aryl), NH(benzyl), N(alk$_1$)(aryl), and N(aryl)(aryl), wherein alk$_1$, alk$_2$ are each independently straight or branched $C_1$-$C_{10}$ alkyl;
  $L_3$ is a mono-dentate two-electron donor selected from the group consisting of CO, P(R)$_3$, P(OR)$_3$, NO$^+$, As(R)$_3$, Sb(R)$_3$, S(R)$_2$, nitrile (RCN) and isonitrile (RNC) wherein R is selected from the group consisting of alkyl, cycloalkyl, aryl, alkylaryl, heterocyclyl and heteroaryl;
  Y and Z are each independently H or an anionic ligand selected from the group consisting of halogen, OCOR, OCOCF$_3$, OSO$_2$R, OSO$_2$CF$_3$, CN, OH, OR, N(R)$_2$, RS and SH; wherein R is as defined above;
  X represents zero, one, two or three substituents selected from the group consisting of alkyl, aryl, halogen, nitro, amide, ester, cyano, alkoxy, cycloalkyl, alkylaryl, heterocyclyl, heteroaryl, an inorganic support and a polymeric moiety.

In another embodiment, the ruthenium complex is represented by the structure of formula A1. In one particular embodiment, Z is H and Y is other than H. In another embodiment, Z is H. In another embodiment, Y is Cl. In another embodiment, $L_3$ is CO. In another embodiment, Z is H, Y is Cl and $L_3$ is CO.

In one embodiment of formula A1, the ruthenium complex is represented by the structure of formula B1.

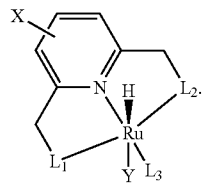

B1 wherein X, $L^1$, $L^2$, $L^3$ and Y are as defined for the complex of A1.

In another particular embodiment of formula A1, the Ruthenium complex is represented by the following structure of formula C1 or D1:

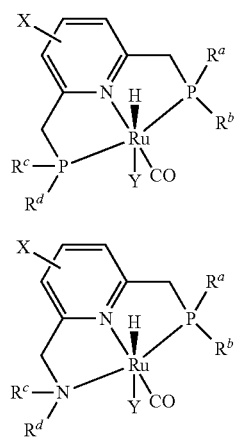

C1

D1 wherein X and Y are as defined for the complex of A1 and each of $R^a$, $R^b$, $R^c$ and $R^d$ is independently selected from the group consisting of alkyl, cycloalkyl, aryl, alkylaryl, heterocyclyl and heteroaryl.

In some embodiments, said at least one ruthenium pincer complex is a Ru-bipyridyl based complex of formula A2:

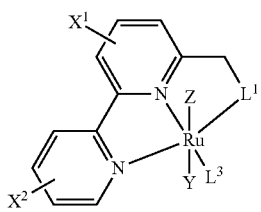

A2 wherein $L^1$ is selected from P(alk$_1$)(alk$_2$), P(alk$_1$)(aryl), P(aryl)(aryl), N(alk$_1$)(alk$_2$), NH(alk$_1$), NH(aryl), NH(benzyl), N(alk$_1$)(aryl) and N(aryl)(aryl), wherein alk$_1$, alk$_2$ are each independently straight or branched $C_1$-$C_{10}$ alkyl;

$L^3$ is a mono-dentate two-electron donor selected from the group consisting of CO, P(R)$_3$, P(OR)$_3$, NO$^+$, As(R)$_3$, Sb(R)$_3$, S(R)$_2$, nitrile (RCN) and isonitrile (RNC) wherein R is selected from the group consisting of alkyl, cycloalkyl, aryl, alkylaryl, heterocyclyl and heteroaryl Y and Z are each independently H or an anionic ligand selected from the group consisting of halogen, OCOR, OCOCF$_3$, OSO$_2$R, OSO$_2$CF$_3$, CN, OH, OR, N(R)$_2$, RS and SH; wherein R is as defined above;

$X^1$ represents zero, one, two or three substituents;

$X^2$ represents zero, one, two, three or four substituents, wherein each such substituent of $X^1$ and $X^2$ is independently selected from the group consisting of alkyl, cycloalkyl, aryl, heterocyclyl, heteroaryl, alkylcycloalkyl, alkylaryl, alkylheterocyclyl, alkylheteroaryl, halogen, nitro, amide, ester, cyano, alkoxy, alkylamino, arylamino, an inorganic support and a polymeric moiety; and anion represents a group bearing a single negative charge.

In one embodiment of formula A2, the ruthenium complex is represented by the structure of formula B2.

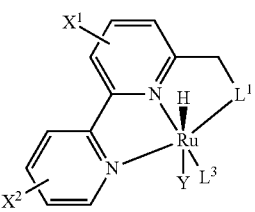

B2 wherein $X^1$, $X^2$, $L^1$, $L^3$ and Y are as defined for the complex of A2.

In one embodiment of formula A2, the ruthenium complex is represented by the structure of formula C2.

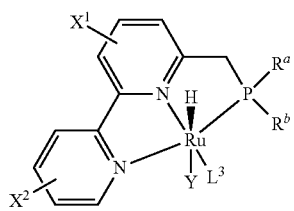

C2

In another embodiment, $X^1$, $X^2$ and Y are as defined for the complex of A2, and each of $R^a$, $R^b$, $R^c$ and $R^d$ is independently selected from the group consisting of alkyl, cycloalkyl, aryl, alkylaryl, heterocyclyl and heteroaryl.

In another embodiment, the ruthenium complex is represented by the structure of formula A2, B2 or C2. In one particular embodiment, Z is H and Y is other than H. In another embodiment, Z is H. In another embodiment, Y is halogen. In another embodiment, Y is Cl. In another embodiment, $L_3$ is CO. In another embodiment, Z is H, Y is Cl and $L^3$ is CO. In one embodiment, $X^1$ and $X^2$ are absent (i.e, the bipyridine moiety is unsubstituted). In another embodiment, $L^1$ is phosphine (PR$^a$R$^b$).

In some embodiments, said at least one ruthenium pincer complex is a Ru-acridine based complex of formula A3:

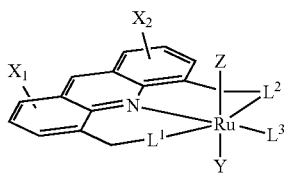

A3 wherein
- $L^1$ and $L^2$ is each independently selected from $P(alk_1)$ $(alk_2)$, $P(alk_1)(aryl)$, $P(aryl)(aryl)$, $N(alk_1)(alk_2)$, $NH(alk_1)$, $NH(aryl)$, $NH(benzyl)$, $N(alk_1)(aryl)$ and $N(aryl)(aryl)$, wherein $alk_1$, $alk_2$ are each independently straight or branched $C_1$-$C_{10}$ alkyl;
- $L^3$ is a mono-dentate two-electron donor selected from the group consisting of CO, $P(R)_3$, $P(OR)_3$, $NO^+$, $As(R)_3$, $Sb(R)_3$, $S(R)_2$, nitrile (RCN) and isonitrile (RNC) wherein R is selected from the group consisting of alkyl, cycloalkyl, aryl, alkylaryl, heterocyclyl and heteroaryl;
- Y and Z are each independently H or an anionic ligand selected from the group consisting of halogen, OCOR, $OCOCF_3$, $OSO_2R$, $OSO_2CF_3$, CN, OH, OR, $N(R)_2$, RS and SH; wherein R is as defined above;
- $X^1$ and $X^2$ are each independently represents zero, one, two or three substituents; wherein each such substituent of $X^1$ and $X^2$ is independently selected from the group consisting of alkyl, cycloalkyl, aryl, heterocyclyl, heteroaryl, alkylcycloalkyl, alkylaryl, alkylheterocyclyl, alkylheteroaryl, halogen, nitro, amide, ester, cyano, alkoxy, alkylamino, arylamino, an inorganic support and a polymeric moiety; and anion represents a group bearing a single negative charge.

In some embodiments, said at least one ruthenium pincer complex is a dearomatized Ru-acridine complex of A4:

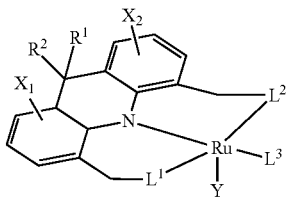

A4 wherein $L^1$, $L^2$, $L^3$, $X^1$, $X^2$ and Y are as defined for complex A3;
$R^1$ and $R^2$ are each independently selected from the group consisting of hydrogen, alkyl, substituted alkyl, cycloalkyl, aryl, heterocyclyl, heteroaryl, alkylcycloalkyl, alkylaryl, alkylheterocyclyl, alkylheteroaryl, ester, cyano, alkoxy, alkylamino, arylamino, an alkyl group connected to an inorganic support, an alkylaryl group connected to an inorganic support, or to a polymeric moiety, such as an organic polymer.

In further embodiments, said at least one ruthenium pincer complex is selected from:

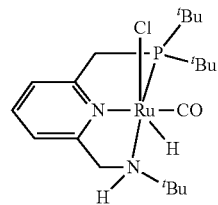

[Ru(P$^{tBu}$NNH$^{tBu}$)H(CO)Cl]
(Ru-1)

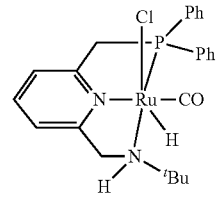

[Ru(P$^{Ph}$NNH$^{tBu}$)H(CO)Cl]
(Ru-2)

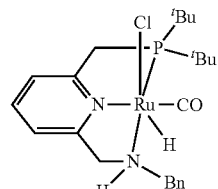

[Ru(P$^{tBu}$NNH$^{Bn}$)H(CO)Cl]
(Ru-3)

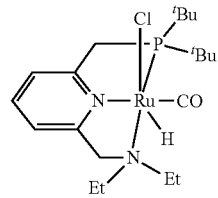

[Ru(P$^{tBu}$NN$^{Et}$)H(CO)Cl]
(Ru-4)

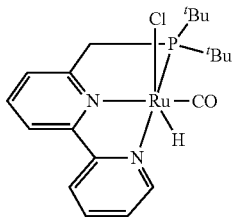

[Ru(P$^{tBu}$NN)H(CO)Cl]
(Ru-5)

-continued

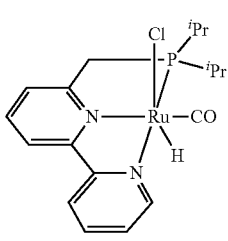

[Ru(P$^{iPr}$NN)H(CO)Cl]
(Ru-6)

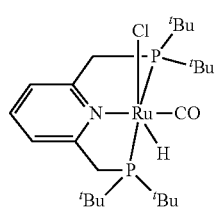

[Ru(P$^{iBu}$NP$^{iBu}$)H(CO)Cl]
(Ru-7)

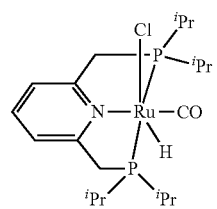

[Ru(P$^{iPr}$NP$^{iPr}$)H(CO)Cl]
(Ru-8)

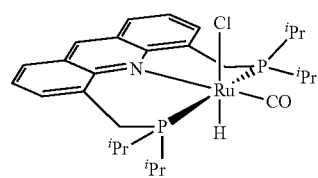

[Ru(AcridineP$^{iPr}$NP$^{iPr}$)H(CO)Cl]
(Ru-9)

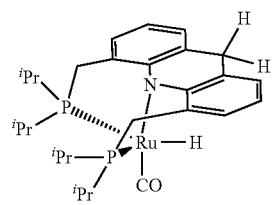

[Ru(9H-Acridine-P$^{iPr}$NP$^{iPr}$)H(CO)]
(Ru-10)

and any combinations thereof.

In some embodiments, said system and method of the invention further comprises at least one organic solvent. In some embodiments said at least one organic solvent is selected from benzene, toluene, o-, m- or p-xylene, mesitylene (1,3,5-trimethyl benzene), dioxane, THF, DME, DMSO, diglyme, DMF (dimethylformamide), valeronitrile, DMAC (dimethylacetamide), NMM (N-methylmorpholine), pyridine, n-BuCN, anisole, cyclohexane and combination thereof. In some embodiments, said system and method of the invention further comprises one organic solvent. In other embodiments said system and method of the invention further comprises a mixture of at least two organic solvents.

In another embodiment, the ruthenium catalyst is absorbed on a solid support and the storing/loading and releasing/discharging hydrogen is done without a solvent.

In some embodiments, said system and method of the invention further comprises at least one organic base. In some embodiments said at least one organic base is alkOK, alkONa, alkOLi and any combinations thereof, wherein alk is a straight or branched $C_1$-$C_8$ alkyl.

In some embodiments, said system of the invention is functioning under a temperature of between about 130° C. to 150° C.

In some embodiments, said system of the invention is functioning under pressure of between about 80 mbar to 110 mbar.

In some embodiments, said discharging of hydrogen is achieved by reacting said ethylene glycol with said at least one transition metal; thereby forming hydrogen and oligoester of ethylene glycol.

In some embodiments, said loading of hydrogen is achieved by reacting said oligoester of ethylene glycol with hydrogen; thereby forming ethylene glycol.

In some embodiments, a reversible hydrogen loading and discharging system of the invention has hydrogen storage capacity of at least 4%, in another embodiment, at least 5%.

In some embodiments, a reversible hydrogen loading and discharging system of the invention has hydrogen storage capacity of at least 5.5%.

In some embodiments, a reversible hydrogen loading and discharging system of the invention has hydrogen storage capacity of between about 4% to about 6.5%.

In some embodiments, a reversible hydrogen loading and discharging system of the invention has hydrogen storage capacity of at least 6.5%.

The invention further provides a reversible hydrogen loading and discharging method comprising the steps of:
(a) hydrogen releasing process wherein ethylene glycol is reacted with at least one transition metal; thereby forming at least one hydrogen molecule and at least one oligoester of ethylene glycol;
(b) hydrogen loading process wherein said at least one oligoester of ethylene glycol is reacted with at least one transition metal and at least one hydrogen molecule; thereby forming at least one ethylene glycol.

Figure 1F:
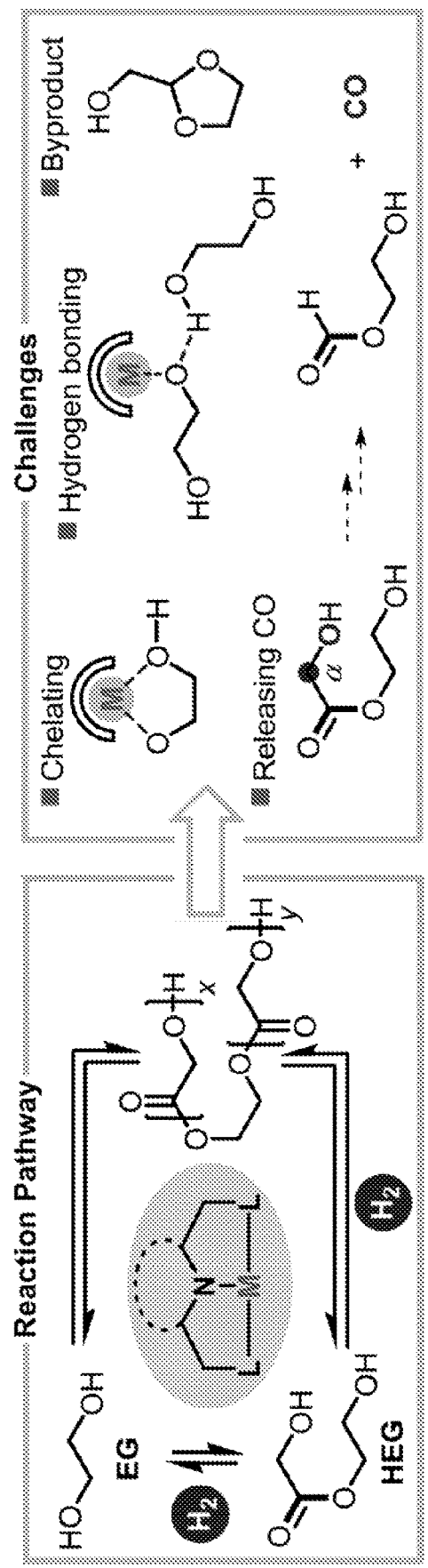

The reaction pathway for utilizing EG is outlined in FIG. 1F. Initially, two molecules of EG are coupled to 2-hydroxyethyl glycolate (HEG), catalyzed by a metal pincer complex accompanied by the release of two equivalents of hydrogen. Subsequently, HEG can react with additional equivalents of EG to afford higher oligomers in a similar fashion. As pointed out, HSC increases with an increase of oligomerization and liberation of $H_2$. For a hydrogen storage system, hydrogenation of the resulting oligomers back to EG should be possible, ideally using the same catalyst. Nevertheless, the acceptorless catalytic dehydrogenative coupling to even HEG is highly challenging. Possible drawbacks that might explain the reluctance of EG to undergo the desired transformation might include: 1) EG chelates the metal center of the pincer complex and hampers catalyst activity; 2) hydrogen bonding between a possible alkoxy metal complex and neighboring EG can hinder f-hydride elimination steps, preventing generation of the aldehyde intermediate; 3) HEG can be dehydrogenated to α-keto ester upon the oxidation of the α-hydroxyl group, which would easily decompose to CO and aldehyde, with subsequent CO poisoning of the catalyst;

4) undesired formation of cyclic side products ((1,3-dioxolan-2-yl)methanol) with lower hydrogen capacities.

In some embodiments, the process/method of any of the embodiments of the present invention as described herein is conducted under neat conditions in the absence of a solvent. In other embodiments, however, the process is conducted in the presence of an organic solvent such as, but not limited to benzene, toluene, o-, m- or p-xylene, mesitylene (1,3,5-trimethyl benzene), dioxane, THF, DME, DMSO, diglyme, DMF (dimethylformamide), valeronitrile, DMAC (dimethylacetamide), NMM (N-methylmorpholine), pyridine, n-BuCN, anisole, cyclohexane or combination thereof.

In another embodiment, the a reversible hydrogen loading and discharging method is conducted with an organic solvent. In another embodiment, the hydrogen release is conducted in a solvent free conditions under reduced pressure functioning under pressure of between about 80 mbar to 110 mbar.

System

In one embodiment, this invention is directed to a LOHC system for the storage and release of hydrogen ($H_2$) on demand, the system comprises ethylene glycol; and at least one transition metal. In another embodiment, the transition metal is a catalyst.

In one embodiment, the discharging of hydrogen is achieved by reacting said ethylene glycol with said at least one transition metal; thereby forming hydrogen and oligoesters of ethylene glycol. In another embodiment, the transition metal is a catalyst.

In one embodiment, the loading of hydrogen is achieved by reacting said oligoesters of ethylene glycol with at least one transition metal and at least one hydrogen molecule; thereby forming ethylene glycol. In another embodiment, the transition metal is a catalyst.

In one embodiment, this invention is directed to a LOHC system. In another embodiment, the LOHC system is used for a hydrogen fuel cell. In another embodiment, the LOHC system is used for fueling internal combustion engine. The LOHC of this invention release hydrogen on-board in vehicles powered by a hydrogen fuel cell, for internal combustion engine, or the LOHC systems store and release hydrogen at service stations, garages, central fleet refueling stations, and in residential individuals' homes, or other points of use. The release of the hydrogen is an on-site generation; and can be produced in individuals' homes or other points of use. Following the release of hydrogen, dehydrogenated compounds are taken to a specialized hydrogenation facility and the LOHC is recovered upon treatment with pressuraized hydrogen and a catalyst.

In one embodiment, the LOHC system of this invention is used for dispensing and monitoring hydrogen based fuel in a vehicle. The system is configured to store, release and dispense the hydrogen in the vehicle. The system also includes a fuel delivery system on the vehicle configured to deliver the hydrogen to the engine, and a control system configured to control the producing system and to monitor the use of the hydrogen by the vehicle.

This invention provides a method for releasing hydrogen gas from the LOHC of this invention and using the hydrogen storage for vehicles powered by a hydrogen fuel cell and/or for internal combustion engine.

In one embodiment, the LOHC can be pumped or poured for distribution to holding tanks and storage vessels. The liquid is easily transported using conventional methods for liquid transport and distribution (pipelines, railcars, tanker trucks). The hydrogen is generated on-site in the vehicle or by a dehydrogenation reactor system that delivers hydrogen and recovers the dehydrogenated substrate in a hydrogenation reactor site.

In one embodiment, the system of this invention comprises a reaction chamber configured to collect the LOHC and the catalyst of the invention; a heating element configured to heat the LOHC and the catalyst to release hydrogen; a buffer tank in flow communication with the reaction chamber configured to collect and temporarily store the hydrogen; a compressor system in flow communication with the buffer tank configured to pressurize the hydrogen to a selected pressure; a storage system in flow communication with the compressor system configured to store a selected quantity of the hydrogen; a dispensing system in flow communication with the storage system configured to dispense the hydrogen to a hydrogen fuel cell or to the internal combustion engine.

In one embodiment, the LOHC system of this invention for use in a vehicle comprises a reaction chamber configured to collect the LOHC and the catalyst of the invention; a heating element configured to heat the LOHC and the catalyst to release hydrogen; a buffer tank in flow communication with the reaction chamber configured to collect and temporarily store the hydrogen; a compressor system in flow communication with the buffer tank configured to pressurize the hydrogen to a selected pressure; a storage system in flow communication with the compressor system configured to store a selected quantity of the hydrogen the selected pressure; a dispensing system in flow communication with the storage system configured to dispense the hydrogen to the hydrogen fuel cell or to the internal combustion engine. A second dispensing system in flow communication with the reaction chamber configured to dispense spent of the reaction to a spent tank, wherein the dehydrogenated substrate is recovered in the presence of pressurized hydrogen. The recovery of the dehydrogenated substrate is done on-board or off-board.

Chemical Definitions

As used herein, the term alkyl, used alone or as part of another group, refers, in one embodiment, to a "$C_1$ to $C_8$ alkyl" or "$C_1$ to $C_{10}$ alkyl" denotes linear and branched, groups, Non-limiting examples are alkyl groups containing from 1 to 6 carbon atoms ($C_1$ to $C_6$ alkyls), or alkyl groups containing from 1 to 4 carbon atoms ($C_1$ to $C_4$ alkyls). Examples of saturated alkyl groups include, but are not limited to, methyl, ethyl, n-propyl, isopropyl, n-butyl, isobutyl, sec-butyl, tert-butyl, amyl, tert-amyl, and hexyl.

The alkyl group can be unsubstituted, or substituted with one or more substituents selected from the group consisting of halogen, hydroxy, alkoxy, aryloxy, alkylaryloxy, heteroaryloxy, oxo, cycloalkyl, phenyl, heteroaryls, heterocyclyl, naphthyl, amino, alkylamino, arylamino, heteroarylamino, dialkylamino, diarylamino, alkylarylamino, alkylheteroarylamino, arylheteroarylamino, acyl, acyloxy, nitro, carboxy, carbamoyl, carboxamide, cyano, sulfonyl, sulfonylamino, sulfinyl, sulfinylamino, thiol, alkylthio, arylthio, or alkylsulfonyl groups. Any substituents can be unsubstituted or further substituted with any one of these aforementioned substituents. By way of illustration, an "alkoxyalkyl" is an alkyl that is substituted with an alkoxy group.

The term "aryl" used herein alone or as part of another group denotes an aromatic ring system containing from 6-14 ring carbon atoms. The aryl ring can be a monocyclic, bicyclic, tricyclic and the like. Non-limiting examples of aryl groups are phenyl, naphthyl including 1-naphthyl and 2-naphthyl, and the like. The aryl group can be unsubstituted or substituted through available carbon atoms with one or more groups defined hereinabove for alkyl. An alkylaryl group denotes an alkyl group bonded to an aryl group (e.g., benzyl).

The term "heteroaryl" used herein alone or as part of another group denotes a heteroaromatic system containing at least one heteroatom ring atom selected from nitrogen, sulfur and oxygen. The heteroaryl contains 5 or more ring atoms. The heteroaryl group can be monocyclic, bicyclic, tricyclic and the like. Also included in this expression are the benzoheterocyclic rings. If nitrogen is a ring atom, the present invention also contemplates the N-oxides of the nitrogen containing heteroaryls. Nonlimiting examples of heteroaryls include thienyl, benzothienyl, 1-naphthothienyl, thianthrenyl, furyl, benzofuryl, pyrrolyl, imidazolyl, pyrazolyl, pyridyl, pyrazinyl, pyrimidinyl, pyridazinyl, indolyl, isoindolyl, indazolyl, purinyl, isoquinolyl, quinolyl, naphthyridinyl, quinoxalinyl, quinazolinyl, cinnolinyl, pteridinyl, carbolinyl, thiazolyl, oxazolyl, isothiazolyl, isoxazolyl and the like. The heteroaryl group can be unsubstituted or substituted through available atoms with one or more groups defined hereinabove for alkyl.

The inorganic support which is attached to the bipyridine ring can be, for example, silica, silica gel, glass, glass fibers, titania, zirconia, alumina and nickel oxide.

The polymer which is attached to the complex of this invention (via one of the rings), is selected from polyolefins, polyamides, polyethylene terephthalate, polyvinylchloride, polyvinylidenechloride, polystyrene, polymethracrylate, natural rubber, polyisoprene, butadiene-styrene random copolymers, butadiene acrylonitrile copolymers, polycarbonate, polyacetal, polyphenylenesulfide, cyclo-olefin copolymers, styrene-acrylonitrile copolymers, ABS, styrene-maleic anhydride copolymers, chloroprene polymers, isobutylene copolymers, polystyrene, polyethylene, polypropylene, and the like.

As used herein, numerical ranges preceded by the term "about" should not be considered to be limited to the recited range. Rather, numerical ranges preceded by the term "about" should be understood to include a range accepted by those skilled in the art for any given element in according to the present invention, for example by up to ±5%-10% of the numerical ranges.

The following examples are presented in order to more fully illustrate the preferred embodiments of the invention. They should in no way, however, be construed as limiting the broad scope of the invention.

EXAMPLES

Materials and Methods

All experiments were carried out in M-BRAUN Unilab 12001780 glovebox under inert atmosphere of purified nitrogen or using standard Schlenk techniques. Reactions were stirred using Teflon-coated magnetic stir bars. Elevated temperatures were maintained using Thermostat-controlled silicone oil baths. Commercially available chemicals were used without further purification unless otherwise mentioned. Ethylene glycol (Acros Organics) was further dried over 4 Å molecular sieves (MS) before using. All solvents were purified according to standard procedures under an argon atmosphere, and stored over 4 Å MS. The pincer complexes [Ru(P$^t$BuNNHBu)H(CO)Cl] (Ru-1), [Ru(PPhNNHBu)H(CO)Cl] (Ru-2), [Ru(P$^t$BuNNHBn)H(CO)Cl] (Ru-3), [Ru(P$^t$BuNNEt)H(CO)Cl] (Ru-4), [Ru(P$^t$BuNN)H(CO)Cl](Ru-5), [Ru(P$^i$PrNN)H(CO)Cl] (Ru-6), [Ru(P$^i$BuNP$^i$Bu)H(CO)Cl] (Ru-7), and [Ru(P$^i$PrNP$^i$Pr)H(CO)Cl] (Ru-8) were prepared according to the literature procedures. Organic solutions were concentrated using a rotary evaporator with a diaphragm vacuum pump. Analytical TLC was performed on Merck silica gel 60 F254 plates. The TLC plates were visualized by treatment with a potassium permanganate (KMnO$_4$) stain followed by gentle heating. Purification of products was accomplished by flash column chromatography on silica gel 60 (Merck, particle diameter 40-63 μm).

NMR spectra were recorded at room temperature either on a Bruker AMX-300, AMX-400 or an AMX-500. Chemical shifts of the NMR spectra are reported relative to d6-DMSO ($^1$H NMR: δ=2.50 ppm, $^{13}$C NMR: δ=39.52 ppm), CDCl$_3$ ($^1$H NMR: δ=7.26 ppm, $^{13}$C NMR: δ=77.16 ppm), C$_6$D$_6$ ($^1$H NMR: δ=7.16 ppm, $^{13}$C NMR: δ=128.06 ppm) or d6-Acetone ($^1$H NMR: δ=2.05 ppm, $^{13}$C NMR: δ=29.84, 206.26 ppm). Data for $^1$H NMR spectra were reported as follows: chemical shift (ppm), peak shape (s=singlet, d=doublet, t=triplet, q=quartet, m=multiplet, dd=doublet of doublets, vt=virtual triplet), coupling constant (Hz), and integration. Data for $^{13}$C NMR were reported in terms of chemical shift (ppm). GC analysis was carried out on HP 6890 with SUPELCO 1-2382 column.

Example 1

General Procedure for Dehydrogenative Coupling of EG Using a Single Solvent

In a glovebox, ethylene glycol (124.1 mg, 2.0 mmol) was added with a glass pipette into a 100 mL Schlenk tube equipped with a magnetic stirring bar. In the glove box, a 5 mL vial containing a magnetic stirring bar was charged with ruthenium pincer complex Ru (0.02 mmol), $^t$BuOK (0.04 mmol) and THF (1.0 mL). The mixture was stirred at room temperature for 10 min, followed by removing the solvent under vacuum. The residue was dissolved in dry and degassed solvent (4×0.5 mL) and the solution was transferred into the above Schlenk tube using the same glass pipette. The Schlenk tube was taken out of the glovebox and stirred at 135° C. for the specified hours. Then the reaction mixture was firstly cooled to room temperature, and then the Schlenk tube was connected to the gas collecting system to measure the volume of gas. Finally, the solvent was removed under vacuum, mesitylene (139 μL, 1.0 mmol) was added into the Schlenk tube as an internal standard. The residue was dissolved in d6-Acetone or d6-DMSO, and the resulting solution was passed through a short Celite column and then submitted for NMR analysis.

Results:

The feasibility of the acceptorless dehydrogenative coupling of EG, was examined by evaluating the PNNH ruthenium complexes Ru-1, Ru-2 and Ru-3 (1 mol % loading) in the presence of 2 mol % potassium tert-butoxide ($^t$BuOK) in refluxing toluene at 135° C. (bath temperature) for 48 hours. Reaction monitoring showed very sluggish conversions, which may be due to the low solubility of EG in toluene (Table 1, entries 1-3).

TABLE 1

Solvent, temperature and catalyst screening for acceptorless dehydrogenative coupling of ethylene glycol

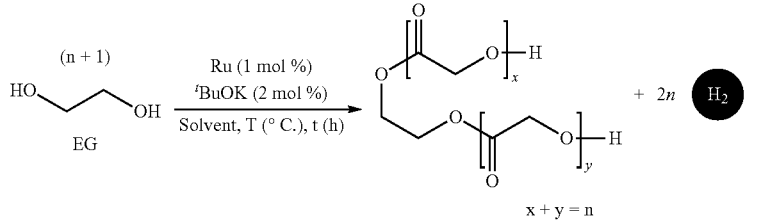

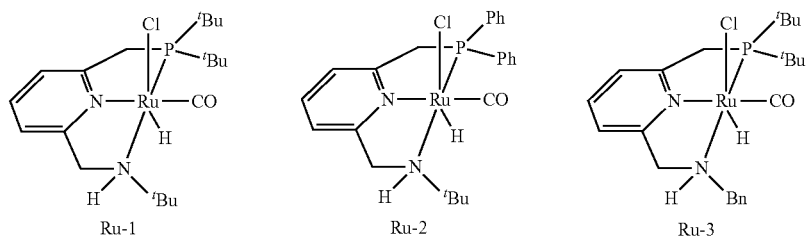

| entry[a] | Ru | Solvent | T (° C.) | t (h) | conv. (%)[b] | V (H$_2$, mL) |
|---|---|---|---|---|---|---|
| 1[c] | Ru-3 | toluene | 135 | 48 | 23 | 10 |
| 2 | Ru-1 | toluene | 135 | 48 | 3 | ~1 |
| 3 | Ru-2 | toluene | 135 | 48 | 8 | ~1 |
| 4 | Ru-3 | THF | 135 | 24 | 50 | 16 |
| 5 | Ru-3 | dioxane | 135 | 24 | 41 | 16 |
| 6 | Ru-3 | DME | 135 | 24 | 53 | 18 |
| 7 | Ru-3 | toluene/DME[d] | 135 | 72 | 56 | 24 |
| 8 | Ru-3 | toluene/DME[d] | 150 | 72 | 83 | 44 |

[a]Reaction conditions: ethylene glycol (2.0 mmol), Ru cat. (1 mol %), $^t$BuOK (2 mol %), solvent (2.0 mL) at 135 or 150° C. (bath temperature) for 24-72 hours.
[b]Conversions were determined by $^1$H NMR from the reaction mixture using mesitylene as an internal standard.
[c]Mesitylene (0.5 mmol) was added as an internal standard.
[d]toluene/DME (v/v = 1:1)

Indeed, the conversions could be increased to 53% in more polar solvents and 18 mL hydrogen were collected within 24 hours by using Ru-3 as the catalyst and 2.0 mmol ethylene glycol in 1,2-dimethoxy ethane (DME) (Table 1, entries 4-6).

Example 2

General Procedure for Dehydrogenative Coupling of EG Using a Mixed Solvent and a Base In a glovebox, ethylene glycol (124.1 mg, 2.0 mmol) was added with a glass pipette into a 100 mL Schlenk tube equipped with a magnetic stirring bar. A 5 mL vial containing a magnetic stirring bar was charged with ruthenium pincer complex Ru (0.02 mmol), $^t$BuOK (0.02-0.04 mmol) and THF (1.0 mL). The mixture was stirred at room temperature for 10 min, followed by removing the solvent under vacuum. The residue was dissolved in dry and degassed toluene (2×0.5 mL) and the solution was transferred into the above Schlenk tube using the same glass pipette. The vial was washed with a second solvent (2×0.5 mL) and the solution was transferred into the Schlenk tube. The Schlenk tube was taken out of the glovebox and stirred at 135° C. or 150° C. for the specified hours. Then the reaction mixture was firstly cooled to room temperature, and then the Schlenk tube was connected to the gas collecting system to measure the volume of gas. Finally, the solvent was removed under vacuum, mesitylene (139 μL, 1.0 mmol) was added into Schlenk tube as an internal standard. The residue was dissolved in d6-Acetone, and the resulting solution was passed through a short Celite column and then submitted to NMR analysis.

Results:

Using a mixture of toluene and DME (v/v=1:1) at 135° C., the reaction efficiency was further improved to 56% (Table 1, entry 7). Elevating the temperature to 150° C. led to 83% conversion and 44 mL hydrogen after 72 hours (FIG. 2 and Table 1, entry 8). Higher degrees of oligoesters were observed via nuclear magnetic resonance (NMR) spectroscopy and mass spectrometry (MS) of the reaction mixture, with HEG as the major product. Examining the gas phase by gas chromatography (GC) showed that the purity of hydrogen was 99.57%. The activity of complexes Ru-1 and Ru-2 was examined using the mixed solvent system, with Ru-3 still giving the best results (FIG. 2, top). Screening other reaction parameters such as concentration (e.g., 0.25 M, 2 M, 4 M), base (e.g., $^t$BuONa, $^t$BuOLi) and other mixed solvents (e.g., toluene/1,4-dioxane, toluene/diglyme) revealed that 1 M solution, BuOK, and a solvent toluene/DME (v/v=1:1) gave the best results (Table 2).

TABLE 2

Concentration, base and mixed solvent screening for acceptorless dehydrogenative coupling of ethylene glycol

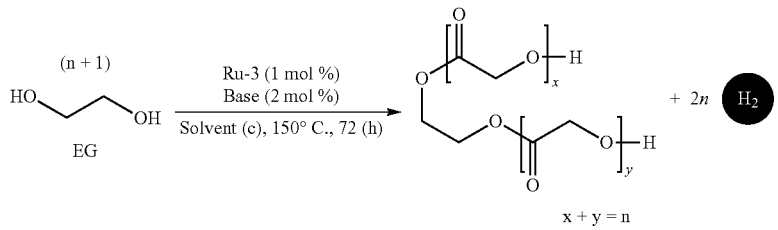

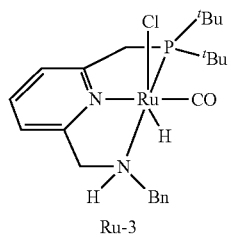

Ru-3

| entry[a] | Base | Solvent | c (M) | conv. (%)[b] | V ($H_2$, mL) |
|---|---|---|---|---|---|
| 1 | $^t$BuOK | toluene/DME[c] | 1 | 83 | 44 |
| 2[d] | $^t$BuOK | toluene/DME[c] | 0.25 | 48 | 14 |
| 3 | $^t$BuOK | toluene/DME[c] | 2 | 78 | 42 |
| 4 | $^t$BuOK | toluene/DME[c] | 4 | 73 | 35 |
| 5 | $^t$BuOK | toluene/DME[c] | 1 | 66 | 32 |
| 6 | $^t$BuOK | toluene/DME[c] | 1 | 40 | 19 |
| 7 | $^t$BuOK | toluene/dioxane | 1 | 79 | 41 |
| 8 | $^t$BuOK | toluene/diglyme[f] | 1 | 51 | 21 |

[a]Reaction conditions: ethylene glycol (2.0 mmol), Ru cat. (1 mol %), $^t$BuOK (2 mol %), solvent (0.5-4 mL) at 150° C. (bath temperature) for 72 hours.
[b]Conversions were determined by $^1$H NMR of the reaction mixture using mesitylene as an internal standard.
[c]toluene/DME (v/v = 1:1).
[d]1 mmol ethylene glycol was used.
[e]toluene/dioxane (v/v = 1:1).
[f]toluene/diglyme (v/v = 1:1).

Example 3

General Procedure for Dehydrogenative Coupling of EG without Base

In a glovebox, ethylene glycol (124.1 mg, 2.0 mmol) was added into a 100 mL Schlenk tube equipped with a magnetic stirring bar through a glass pipette. A 5 mL vial containing a magnetic stirring bar was charged with ruthenium pincer complex Ru-10 (0.02 mmol) and dry and degassed toluene (1.0 mL) and the solution was transferred into the above Schlenk tube using the same glass pipette. The vial was washed with dimethoxyethane (DME, 2×0.5 mL) and the solution was transferred into the Schlenk tube. The Schlenk tube was taken out of the glovebox and stirred at 150° C. for 72 hours. Then the reaction mixture was firstly cooled to room temperature, and then the Schlenk tube was connected to the gas collecting system to measure the volume of gas (61 mL gas was collected in total). Finally, the solvent was removed under vacuum, mesitylene (139 μL, 1.0 mmol) was added into Schlenk tube as an internal standard. The residue was dissolved in d6-Acetone, and the resulting solution was passed through a short Celite column and then submitted to NMR analysis. $^1$H NMR indicated that the conversion was 97%.

Results:

In order to further improve the reaction efficiency, the inventors have screened other types of catalysts of this invention. As shown in FIG. 2 (middle), the PNN ruthenium pincer complexes Ru-4, Ru-5 and Ru-6 also catalyze this transformation, although with lower conversions (26-43%) and less evolved hydrogen (13-23 mL). Use of the PNP ruthenium complexes Ru-7 and Ru-8 drastically slowed down the dehydrogenative reaction (FIG. 2, bottom). Notably, a significant improvement was achieved by using the acridine-based PNP ruthenium complex Ru-9. With this system a conversion of 94% was achieved, together with the formation of 54 mL hydrogen (purity: =99.65%, see Table 3, entry 9).

TABLE 3

Catalyst screening for acceptorless dehydrogenative coupling of ethylene glycol $$(n+1)\ HO\diagup\diagdown OH \xrightarrow[\text{Toluene (1.0 mL)/DME (1.0 mL), 150° C., 72 (h)}]{\text{Ru (1 mol \%)}, \ ^t\text{BuOK (1-2 mol \%)}} \text{oligoester} + 2n\ H_2$$

EG x + y = n

| entry[a] | Ru | conv. (%)[b] | V (H$_2$, mL) |
|---|---|---|---|
| 1[c] | Ru-1 | 46 | 22 |
| 2[c] | Ru-2 | 41 | 20 |
| 3[c] | Ru-3 | 83 | 44 |
| 4[c] | Ru-4 | 43 | 23 |
| 5[c] | Ru-5 | 38 | 20 |
| 6[c] | Ru-6 | 26 | 13 |
| 7[d] | Ru-7 | 12 | 4 |
| 8[d] | Ru-8 | 20 | 8 |
| 9[d] | Ru-9 | 94 | 54 |
| 10[e] | Ru-10 | 97 | 61 |

[a]Reaction conditions: ethylene glycol (2.0 mmol), Ru cat. (1 mol %), $^t$BuOK (1-2 mol %), toluene (1.0 mL)/DME (1.0 mL) at 150° C. (bath temperature) for 72 hours.
[b]Conversions were determined by $^1$H NMR of the reaction mixture using mesitylene as an internal standard.
[c]2 mol % $^t$BuOK was used.
[d]1 mol % $^t$BuOK was used.
[e]Reaction was performed without base.

Based on NMR spectroscopy of the crude reaction mixture, the yield of HEG was determined to be 33%, with the remaining conversion being due to higher oligoesters.

Figure 3A:
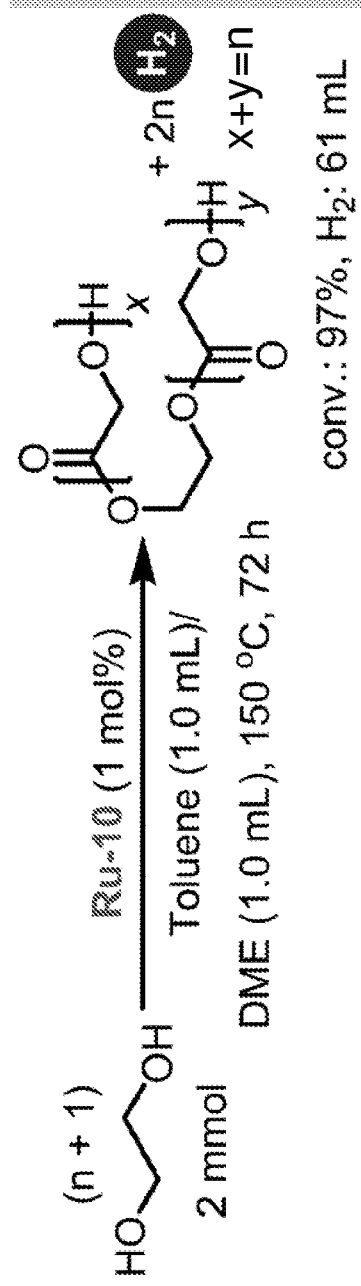
FIGS. 3A-3C show the results of catalytic acceptorless dehydrogenative coupling of ethylene glycol using dearomatized complex Ru-10.

Further to the above results the inventors considered to use the dearomatized complex Ru-10 as a catalyst and performed the reaction under base-free conditions. The dehydrogenative coupling of EG proceeded smoothly in the presence of 1 mol % of Ru-10, affording substantial improvement over the PNN and PNNH family of ruthenium complexes (97% conversion, 61 mL hydrogen with 99.59% purity, FIG. 3A). Analyzing the reaction mixture showed that higher oligomers (n up to 6) were formed as well. Accordingly, a base-free catalytic system that consists of Ru-10 (1 mol %) and a mixed solvent of toluene/DME (v/v=1:1) gave the best performance of the acceptorless dehydrogenative coupling of EG.

Example 4

General Procedure for Reverse Hydrogenation of the Reaction Mixture

In a glovebox, a 25 mL stainless steel autoclave with a Teflon tube containing a magnetic stirring bas was charged with Ru-10 (0.02 mmol). The dehydrogenated reaction mixture in a 5 mL vial was dissolved in dry and degassed toluene (2×0.5 mL) and the solution was transferred into the Teflon tube of the autoclave. The vial was washed with dimethoxyethane (DME, 2×0.5 mL) and the solution was transferred into the Teflon tube of the autoclave. The autoclave was taken out of the glovebox and purged five times with hydrogen and finally pressurized to 40 bar. The reaction mixture was stirred at 150° C. (oil bath temperature) for 48 hours, and then was cooled to room temperature in an ice bath. Then the reaction mixture was transferred into a 25 mL vial and the solvent was removed under vacuum, mesitylene (139 µL, 1.0 mmol) was added into Schlenk tube as an internal standard. The residue was dissolved in d6-Acetone, and the resulting solution was passed through a short Celite column and then submitted to NMR analysis. $^1$H NMR indicated that the conversion was 100% and the yield of ethylene glycol was 92%.

Figure 3B:
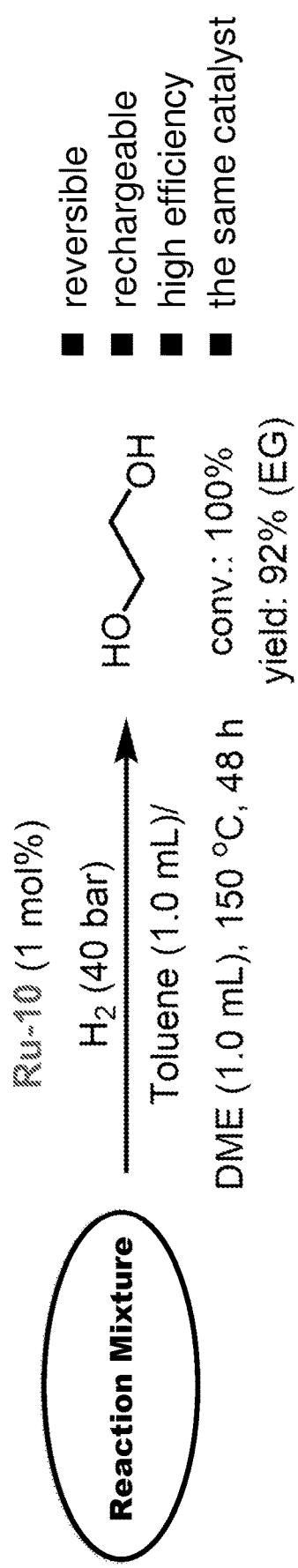

Results:

In order to explore the reverse hydrogenation reaction under similar conditions, the inventors carried out the hydrogenation reactions using complex Ru-10. Interestingly, the reaction mixture depicted in FIG. 3A was fully hydrogenated back to EG (92% NMR yield) in the presence of 1 mol % of Ru-10 under 40 bar of hydrogen and a mixed solvent (toluene/DME, v/v=1:1) within 48 hours (FIG. 3B). Thus, EG and its oligoesters could be interconverted using the same pincer ruthenium complex catalyst. The above results indicate that a reversible LOHC system based on EG is possible using pincer complex Ru-10 as catalyst.

Example 5

General Procedure for Dehydrogenative Coupling of EG Under Reduced Pressure Using No Solvent In a glovebox, ethylene glycol (2.0 mL, 35.8 mmol) and Ru-10 (102.7 mg, 0.18 mmol) were added into a 5.0 mL flask equipped with a magnetic stirring bar and a reflux condenser. The reaction flask was taken out of the glovebox under nitrogen protected condition. Then the reaction system was connected to the vacuum pump through the top of the reflux condenser (connecting quickly). The resulting mixture was stirred at 150° C. for 168 hours under a pressure of 95 mbar. Then the reaction mixture was firstly cooled to room temperature, and mesitylene (624 µL, 4.5 mmol) was added as an internal standard. The residue was dissolved in d6-Acetone, and the resulting solution was passed through a short Celite column and then submitted to NMR analysis. $^1$H NMR indicated that the conversion was 94%.

Results

Figure 3C:
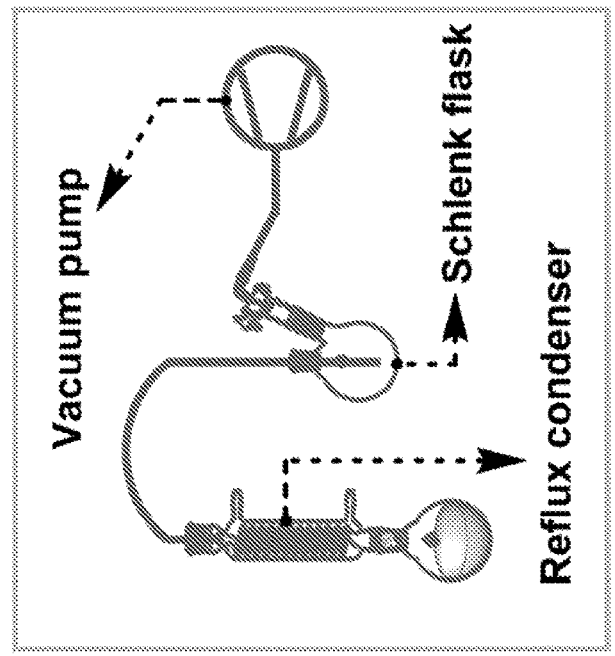
Figure 3C:
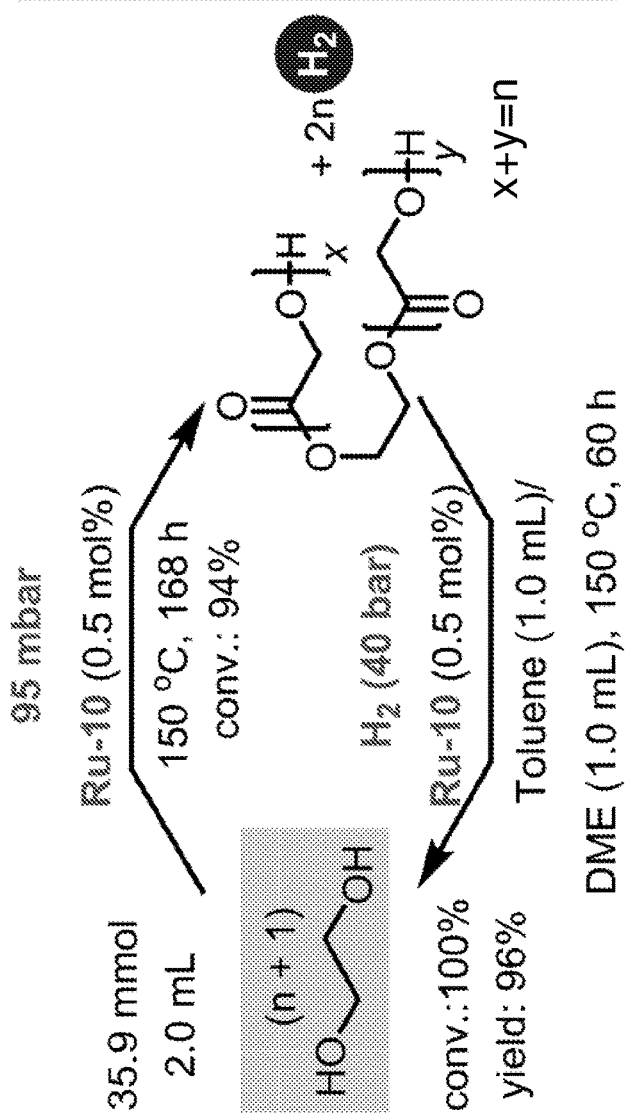

Solvent-free reaction conditions are advantageous regarding optimal hydrogen capacity of the system, potentially shortened reaction time, reduced energy consumption, and lower capital investment; therefore they are considered more environmentally benign and cost-effective. Hence, a solvent-free LOHC system might be more attractive for industrial applications. Moreover, solvent-free conditions can facilitate polymerization reactions. The inventors performed the dehydrogenation reaction of EG on a larger scale (35.8 mmol, 2 mL) under neat conditions at 150° C. and reduced pressure (95 mbar). Under these conditions, 94% conversion was obtained after seven days using 0.5 mol % of Ru-10 (FIG. 3C). Based on the $^1$H NMR of the crude reaction mixture it is estimated that 1295 mL of hydrogen were formed, with an average degree of oligomerization of 3.98. Reduced pressure is used to effectively keep the reaction system under reflux for efficient removal of the generated hydrogen and drive the reaction forward. Moreover, the above crude reaction mixture could be fully hydrogenated back to EG within 60 hours in the presence of 0.5 mol % of Ru-10 under 40 bar of hydrogen in a mixed toluene/DME (1 mL/1 mL) solvent.

Example 7

Mechanistic Studies

Figure 4:
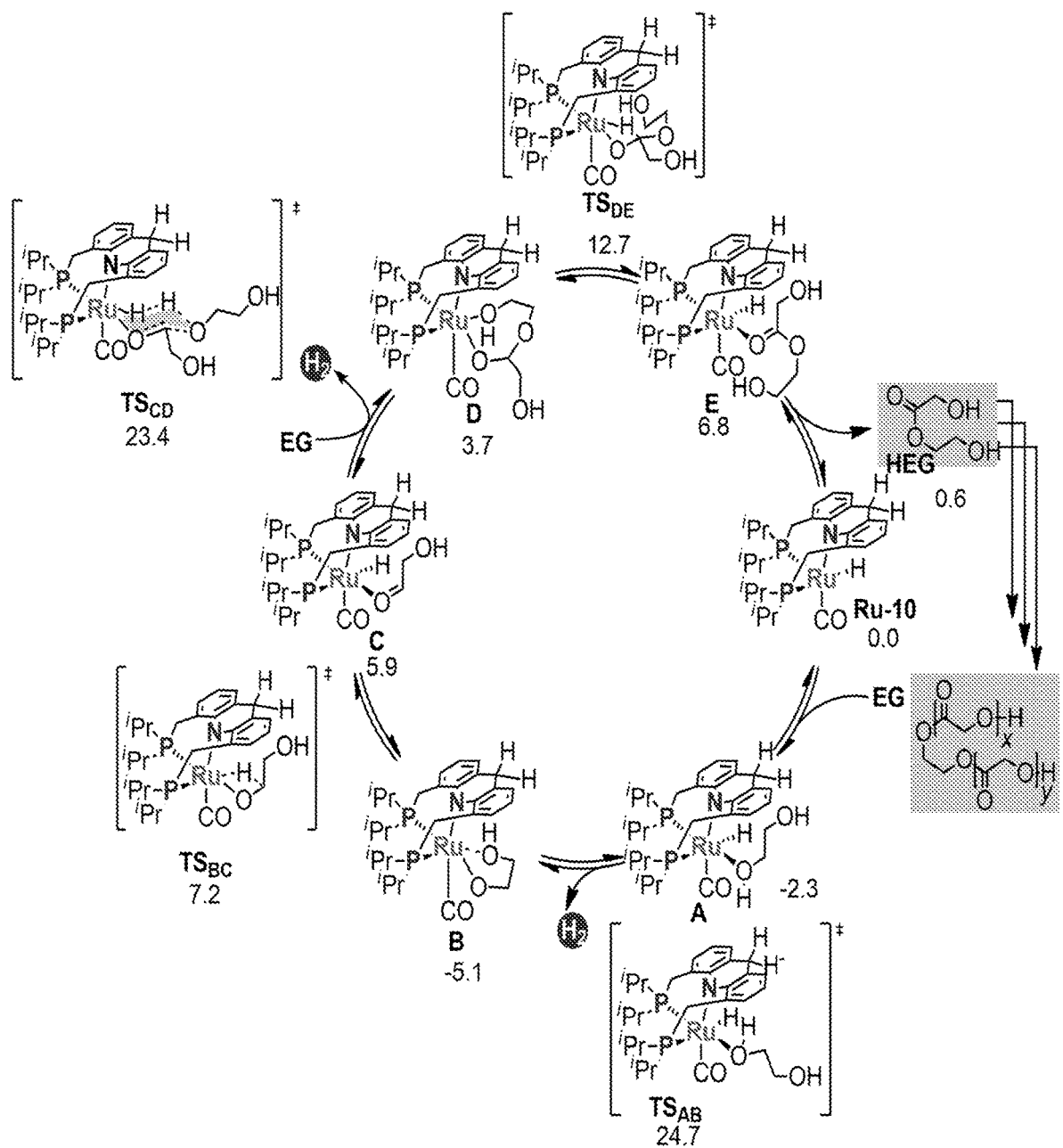
FIG. 4 shows the proposed catalytic cycle. All values correspond to Gibbs Free Energies at 423.15 K (in kcal·mol$^{-1}$ with respect to the starting material).
Figure 5:
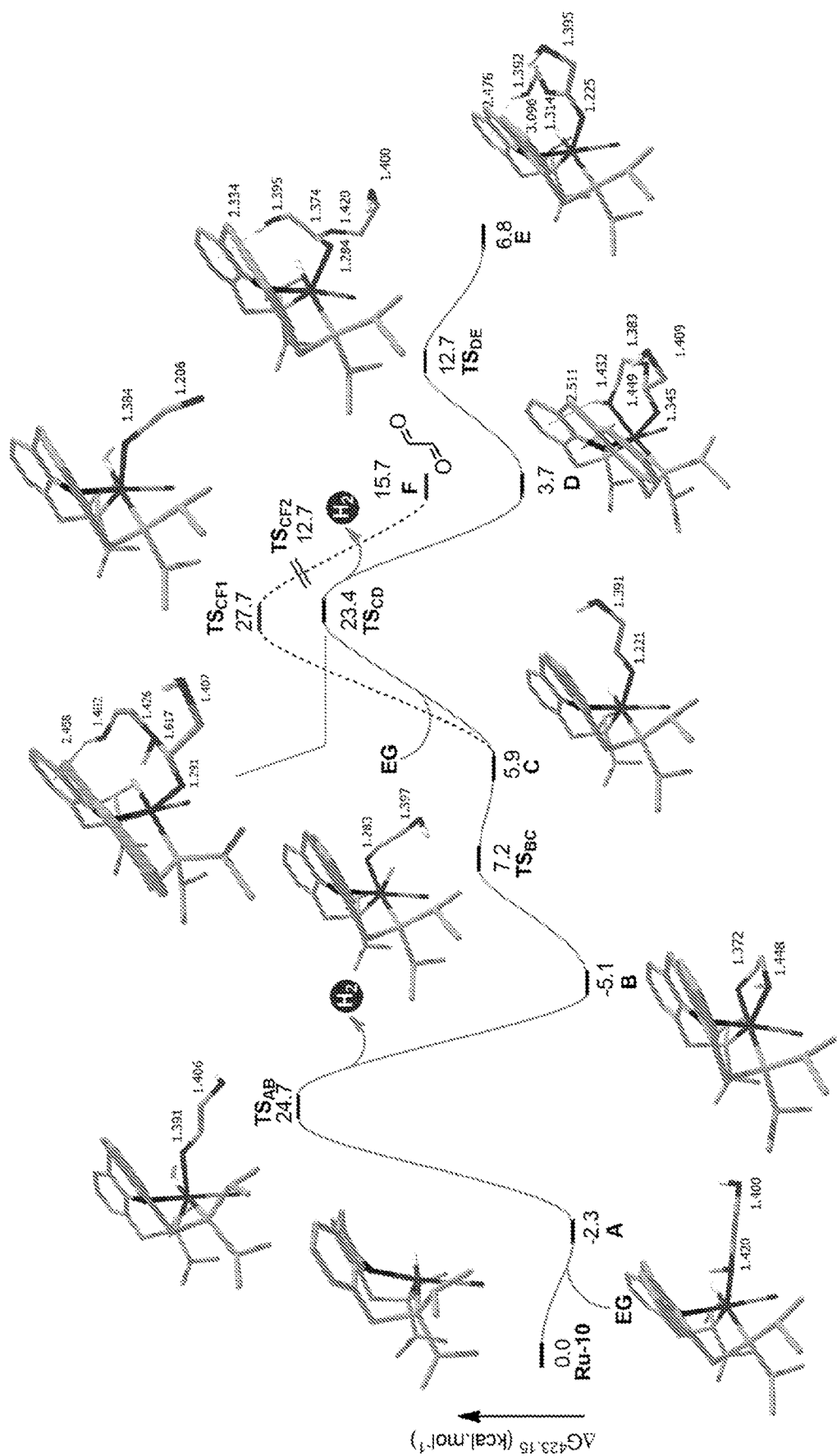
FIG. 5 shows the energy levels of the proposed catalytic cycle. Values correspond to Gibbs Free Energies (in kcal·mol$^{-1}$ with respect to the starting material) at 423.15 K. Values in structures highlight OH-π interactions (in Å) and distinguish sp$^2$ from sp$^3$ C—O bonds. C—H bonds are omitted for clarity.

In order to gain mechanistic insight regarding the reversible dehydrogenation/hydrogenation of EG catalyzed by Ru-10, DFT calculations were employed. Importantly, overall the dehydrogenation of EG to HEG is calculated to be endergonic by only 0.6 kcal·mol$^{-1}$, highlighting the readily feasible and reversible dehydrogenation/hydrogenation events. In the first step, EG can add to the 5-coordinate complex Ru-10 yielding intermediate A (FIG. 4). This reaction is only slightly downhill in energy (−2.3 kcal·mol$^{-1}$), which might be explained by a distorted octahedral geometry imposed by the facial acridine-backbone in 6-coordinated intermediate A (equatorial P—Ru—O and P—Ru—H angles of 161.6° and 169.4° respectively). Dehydrogenation by protonation of the Ru—H bond via TS$_{AB}$ (24.7 kcal·mol$^{-1}$) liberates one equivalent of H$_2$ together with the formation of κ2-alkoxide coordinated B (−5.1 kcal·mol$^{-1}$). Decoordination of the hydroxo group allows for β-hydride elimination via TS$_{BC}$ (7.2 kcal·mol$^{-1}$), and reforms a Ru—H bond in C (5.9 kcal·mol$^{-1}$). With another molecule of EG, C undergoes dehydrogenation to D (3.7 kcal·mol$^{-1}$) via a concerted Zimmerman-Traxler-like 6-membered transition state (TS$_{CD}$, 23.4 kcal·mol$^{-1}$). Importantly, the pathway from C to glyoxal (15.7 kcal·mol$^{-1}$, intermediate F, FIG. 5) without addition of EG via dehydrogenation (TS$_{CF1}$, 27.7 kcal·mol$^{-1}$, FIG. 5) and β-hydride elimination (TS$_{CF2}$, 12.7 kcal·mol$^{-1}$, FIG. 5) is both kinetically and thermodynamically unfavored. In addition, also the formation of cyclic products from hemiacetals with lower HSC is avoided by high lying transition states (TS$_{CG}$=45.6 kcal·mol$^{-1}$ and TS$_{HI}$=54.2 kcal·mol$^{-1}$). Another β-hydride elimination event (12.7 kcal·mol$^{-1}$) from κ2-hemiacetalate D gives the metal bound ester E (6.8 kcal·mol$^{-1}$). Finally, decoordination re-forms the active catalyst Ru-10 and releases HEG. Noteworthy, the lowest lying intermediate, namely B, is only 5.1 kcal·mol$^{-1}$ more stable than the active catalyst Ru-10, although Ru-10 is unsaturated. Again, a higher stabilization is most likely hindered by the strained geometry (equatorial P—Ru—O angles of 160.8° and 165.2° respectively in B) and thus prevents a higher energetic span. Moreover, the aromatic acridine backbone is involved in OH-π interactions upon addition of a second EG unit in transition states TS$_{CD}$ and TS$_{DE}$ as well as intermediates D and E. This might not only favor hemiacetalate formation over the glyoxal pathway (FIG. 5) by enabling a H-bond stabilized Zimmerman-Traxler like transition state, but also prevent water elimination from the hemiacetalate upon cyclization by binding the OH-group of the side-arm. This might also prevent extensive hydrogen bonding with non-coordinated EG/HEG in solution. Hence, the unique characteristics of the acridine ligand framework enable Ru-10 to overcome the challenges outlined in FIG. 1F. Finally, rate-limiting transition states are associated with dehydrogenation events, whereas hydride abstraction is readily achieved.

Example 8

Synthesis of Complexes Ru-9 and Ru-10

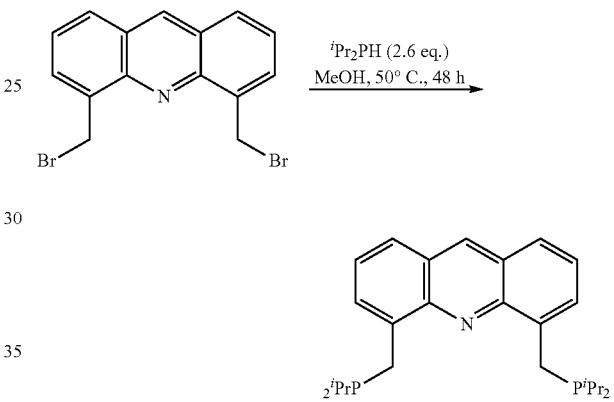

In a glovebox, 4,5-bis(bromomethyl)acridine (2.0 g, 5.5 mmol) was dissolved in methanol (25 mL) in an oven-dried 100 mL Schlenk flask equipped with a magnetic stirring bar. Then diisopropylphosphane (1.7 g, 14.3 mmol) was added. The flask was sealed and taken out of the glovebox, and stirred at 50° C. for 48 hours. After cooling the reaction mixture to room temperature, the Schlenk flask was taken into the glovebox again and triethylamine (2.2 g, 21.8 mmol) was added, and the resulting solution was stirred at room temperature for 1 hour. The solvent was removed under vacuum and then ether (50 mL) was added. After filtration, the cake was washed with ether (2×10 mL) and combined the liquid phase. Removing the ether from the liquid phase under vacuum gave the crude product as a brown solid. The crude product was dissolved in a small amount of acetone and pentane in a 25 mL vial, which then was put in a refrigerator (−30° C.) for 24 hours. A yellow solid was formed in the vial. The liquid phase was removed and the yellow solid was washed with cold pentane, affording the desired product. Yield: 50% (yellow solid, 1.2 g) $^1$H NMR (400 MHz, CDCl$_3$) δ (ppm)=8.67 (s, 1H), 7.92-7.87 (m, 2H), 7.80 (d, J=8.4 Hz, 2H), 7.46 (dd, J=8.4, 6.9 Hz, 2H), 3.79 (d, J=2.8 Hz, 4H), 1.90 (m, 4H), 1.13-1.08 (m, 24H). $^{13}$C{$^1$H} NMR (101 MHz, CDCl$_3$) δ (ppm)=147.01, 146.98, 139.66, 139.58, 136.45, 130.02, 129.90, 126.75, 125.74, 125.72, 125.53, 24.01, 23.86, 23.62, 23.44, 19.99, 19.85, 19.67, 19.56. $^{31}$P{$^1$H} NMR (162 MHz, CDCl$_3$) δ (ppm)=14.52.

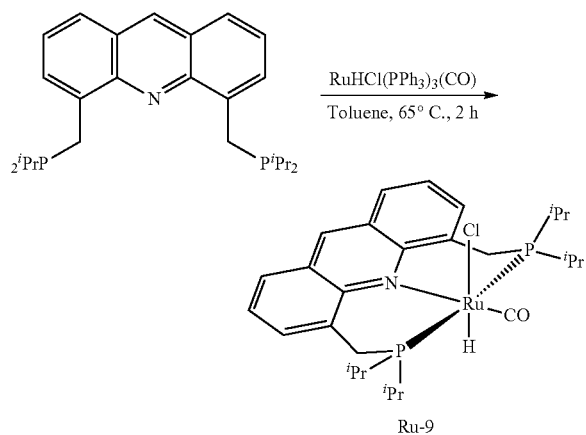

In a glovebox, 4,5-bis((diisopropylphosphanyl)methyl) acridine (158.2 mg, 0.36 mmol) and RuHCl(PPh$_3$)$_3$(CO) (286.3 mg, 0.3 mmol) were suspended in toluene (20 mL) in an oven-dried 100 mL Schlenk flask equipped with a magnetic stirring bar. The flask was sealed and taken out of the glovebox, and stirred at 65° C. for 2 hours. After cooling the reaction mixture to room temperate, the Schlenk flask was taken into the glovebox again and the solvent was removed under vacuum. The resulting copper-colored solid was washed with pentane for several times to give the desired product Ru-9 as a nut-brown solid. Yield: 85% (nut-brown solid, 154.3 mg) $^1$H NMR (400 MHz, C$_6$D$_6$) δ (ppm)=8.17 (s, 1H), 7.49 (d, J=8.2 Hz, 2H), 7.35 (d, J=6.9 Hz, 2H), 7.06 (t, J=7.5 Hz, 2H), 5.24 (d, J=12.4 Hz, 2H), 3.51 (m, 2H), 3.13 (m, 2H), 1.79 (q, J=7.3 Hz, 6H), 1.55 (m, 8H), 1.04 (q, J=6.3 Hz, 6H), 0.89 (q, J=7.5 Hz, 6H), −16.10 (t, J=19.0 Hz, 1H). $^{13}$C{$^1$H} NMR (101 MHz, C$_6$D$_6$) δ (ppm)=203.44 (vt), 151.43 (vt), 142.19, 135.76, 135.09 (vt), 129.16, 124.72, 32.06 (vt), 25.90 (vt), 24.16 (vt), 22.00, 20.92, 19.50 (vt), 18.68. $^{31}$P{$^1$H} NMR (162 MHz, C$_6$D$_6$) δ (ppm)=69.79.

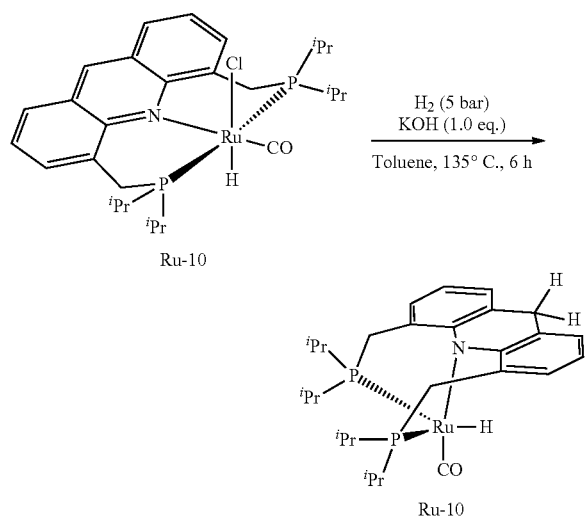

In a glovebox, Ru-9 (78.7 mg, 0.13 mmol) and KOH (7.3 mg, 0.13 mmol) were suspended in toluene (8.0 mL) in a 90 mL Fischer-Porter tube equipped with a magnetic stirring bar. The Fischer-Porter tube was taken out of the glovebox and pressurized with hydrogen (2.0 bar), and stirred at 135° C. for 6 hours. After cooling the reaction mixture to room temperate, the Fischer-Porter tube was taken into the glovebox again and the solvent was removed under vacuum. The resulting solid was washed with pentane for several times to give the desired product Ru-10 as a red solid. Yield: 86% (red solid, 63.8 mg) $^1$H NMR (400 MHz, C$_6$D$_6$) δ (ppm)=7.23 (m, 2H), 6.96 (m, 4H), 3.78 (d, J=14.4 Hz, 1H), 3.60 (d, J=14.4 Hz, 1H), 2.98 (d, J=12.6 Hz, 2H), 2.64-2.59 (m, 2H), 2.03 (m, 2H), 1.57 (m, 21 2H), 1.32-1.26 (m, 6H), 1.25-1.20 (m, 6H), 1.08-1.02 (m, 6H), 0.77-0.72 (m, 6H), 20.69 (t, H). $^{13}$C{$^1$H} NMR (101 MHz, C$_6$D$_6$) δ (ppm)=210.17 (t), 153.05 (vt), 126.56, 121.66, 119.39, 36.56, 27.86 (vt), 25.71 (vt), 24.29 (vt), 20.39 (vt), 19.22, 18.73 (vt), 17.65. $^{31}$P{$^1$H} NMR (162 MHz, C$_6$D$_6$) δ (ppm)=75.67.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A reversible hydrogen loading and discharging method comprising the steps of:
   a) hydrogen releasing process wherein ethylene glycol is reacted with at least one transition metal catalyst; thereby forming hydrogen molecule (H$_2$) and oligoester of ethylene glycol;
   b) hydrogen loading process wherein said oligoester of ethylene glycol is reacted with at least one transition metal catalyst and hydrogen molecule (H$_2$); thereby forming ethylene glycol.

2. The reversible hydrogen loading and discharging method according to claim 1, wherein said at least one transition metal catalyst is selected from Mn, Fe, Co, Ni, Ru, Rh, Pd, Cu, Ag or any combinations thereof.

3. The reversible hydrogen loading and discharging method according to claim 1, wherein said at least one transition metal catalyst is a coordination complex.

4. The reversible hydrogen loading and discharging method according to claim 1, wherein said at least one transition metal catalyst is supported on insoluble matrices; wherein the insoluble matrices are insoluble inorganic compounds comprising inorganic oxides or insoluble polymers.

5. The reversible hydrogen loading and discharging method according to claim 1, wherein said at least one transition metal catalyst is a ruthenium pincer complex catalyst.

6. The reversible hydrogen loading and discharging method according to claim 5, wherein said ruthenium pincer complex is selected from Ru—PNNH complex, Ru—PNN complex, Ru—PNP complex and any combinations thereof.

7. The reversible hydrogen loading and discharging method according to claim 6, wherein said at least one ruthenium pincer complex is selected from [Ru(PtBuNNHtBu)H(CO)Cl] (Ru-1), [Ru(PPhNNHtBu)H(CO)Cl] (Ru-2), [Ru(PtBuNNHBn)H(CO)Cl] (Ru-3), [Ru(PtBuNNEOH(CO)Cl] (Ru-4), [Ru(PtBuNN)H(CO)Cl] (Ru-5), [Ru(PiPrNN)H(CO)Cl] (Ru-6), [Ru(PtBuNPtBu)H(CO)Cl] (Ru-7), [Ru(PiPrNPiPr)H(CO)Cl] (Ru-8), [Ru(Acridine-PiPrNPiPr)H(CO)Cl] (Ru-9) and [Ru(9H-Acridine-PiPrNPiPr)H(CO)] (Ru-10) and any combinations thereof.

8. The reversible hydrogen loading and discharging method according to claim 1, further comprising at least one organic solvent.

9. The reversible hydrogen loading and discharging method according to claim 1, further comprising at least one organic base.

10. The reversible hydrogen loading and discharging method according to claim 1, wherein said method is functioning under a temperature of between about 130° C. to 150° C.

11. The reversible hydrogen loading and discharging method according to claim 1, wherein said method is functioning under pressure of between about 80 mbar to 110 mbar.

12. The reversible hydrogen loading and discharging method according to claim 1, capable of hydrogen storage capacity of at least 4 wt %.

13. The reversible hydrogen loading and discharging method according to claim 4, wherein said inorganic oxides are selected from alumina, silica, titania, zirconia, magnesia, zeolites, or any combinations thereof, optionally attached via tether.

14. The reversible hydrogen loading and discharging method according to claim 4, wherein said insoluble polymers are cross-linked polystyrene, attached via a tether.

* * * * *